United States Patent [19]
Ogata et al.

[11] Patent Number: 5,940,364
[45] Date of Patent: *Aug. 17, 1999

[54] OPTICAL DISK INCLUDING WOBBLED GUIDING GROOVE COMPOSED OF PITS, OPTICAL DISK MANUFACTURING APPARATUS, AND OPTICAL DISK RECORDING/REPRODUCING APPARATUS

[75] Inventors: Nobuo Ogata, Nara; Yasuo Nakata, Takaichi-gun; Yoshihiro Sekimoto, Soraku-gun, all of Japan

[73] Assignee: Sharp Kabushiki Kaisha, Osaka, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/843,699

[22] Filed: Apr. 16, 1997

[51] Int. Cl.$^6$ ........................................ G11B 7/24
[52] U.S. Cl. ..................... 369/275.4; 369/275.2
[58] Field of Search .................... 369/275.4, 275.2, 369/275.3, 275.1, 58, 44.16

[56] References Cited

U.S. PATENT DOCUMENTS

| | | |
|---|---|---|
| 4,769,802 | 9/1988 | Tatsuguchi ............................. 369/46 |
| 5,150,339 | 9/1992 | Ueda et al. ............................. 369/32 |
| 5,218,599 | 6/1993 | Tsuyoshi et al. ..................... 369/275.1 |
| 5,241,531 | 8/1993 | Ohno et al. .......................... 369/275.3 |
| 5,844,883 | 12/1998 | Kanno et al. ........................ 369/275.4 |
| 5,852,599 | 12/1998 | Fuji ....................................... 369/275.4 |

FOREIGN PATENT DOCUMENTS

| | | |
|---|---|---|
| 5-314538 | 11/1993 | Japan . |
| 6-338066 | 12/1994 | Japan . |
| 8-7339 | 1/1996 | Japan . |

*Primary Examiner*—Tan Dinh
*Attorney, Agent, or Firm*—David G. Conlin; Dike, Bronstein, Roberts & Cushman, LLP

[57] ABSTRACT

An optical disk having thereon intermittent spiral guiding grooves composed of a pit array, wherein each guiding groove has a wobbling side wall at either side, so that the pit array is used as a data reproduce-only area and spaces between adjacent guiding grooves are used as a data recordable area, thereby realizing a high-density optical disk having both the data reproduce-only area and data recordable area.

58 Claims, 24 Drawing Sheets

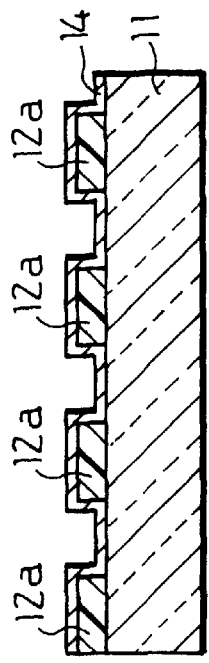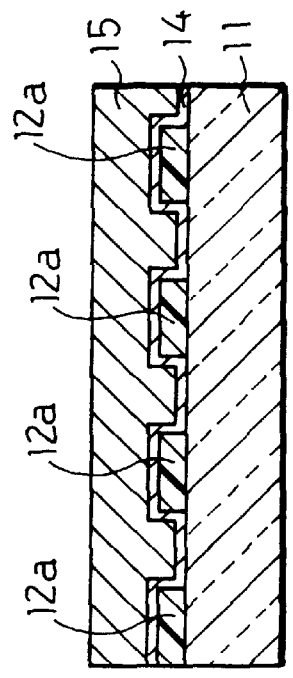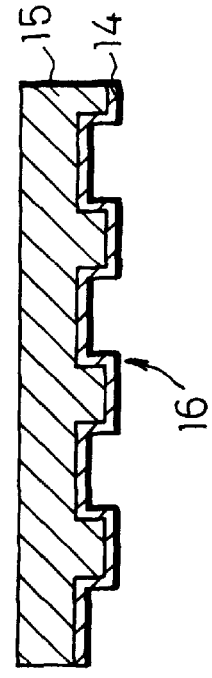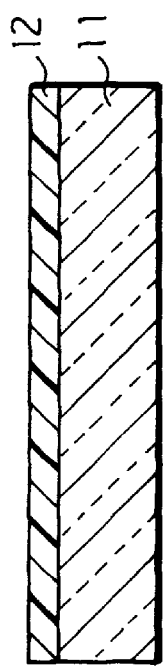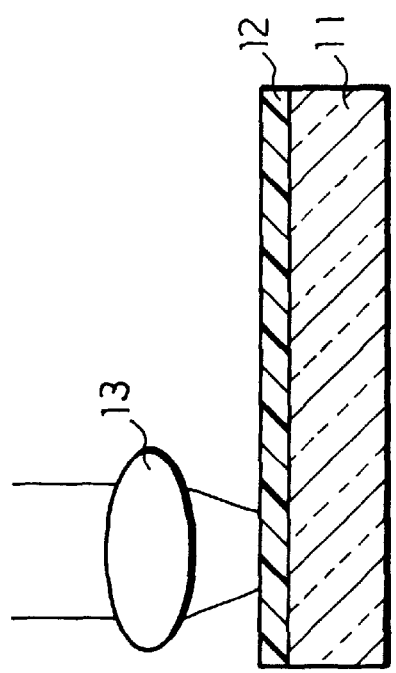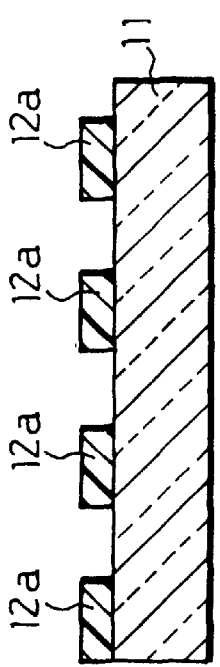

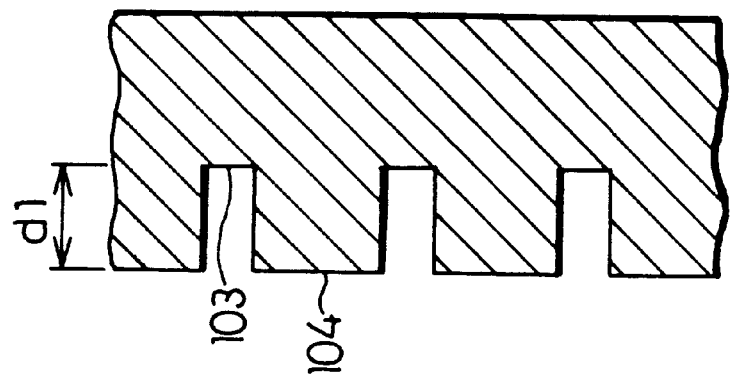
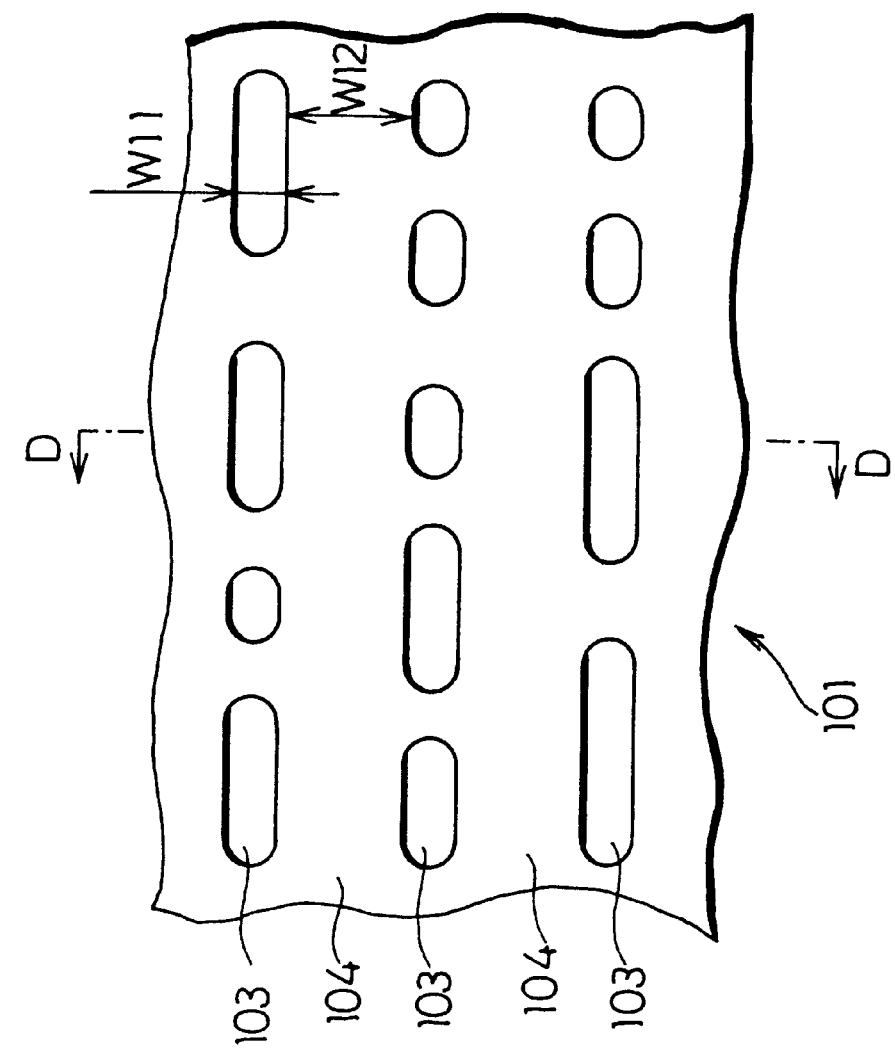
FIG. 23 b PRIOR ART
FIG. 23 a PRIOR ART

OPTICAL DISK INCLUDING WOBBLED GUIDING GROOVE COMPOSED OF PITS, OPTICAL DISK MANUFACTURING APPARATUS, AND OPTICAL DISK RECORDING/REPRODUCING APPARATUS

FIELD OF THE INVENTION

The present invention relates to (1) a hybrid optical disk having both a data reproduce-only area and a data recordable area, (2) a manufacturing apparatus of such an optical disk, and (3) an optical disk recording/reproducing apparatus for recording/reproducing data into/from such an optical disk.

BACKGROUND OF THE INVENTION

Optical disks include two types in terms of recording manner: one is a data reproducing-only optical disk, and the other is a data recording/reproducing optical disk, such as a rewritable optical disk or a write-once optical disk. A typical example of the reproducing-only optical disk is a compact disk, from which pre-recorded data in the form of concave and convex pattern of pits are reproduced as a light beam detects the pits. On the other hand, the data are reproduced from the recording/reproducing optical disk through the magneto-optical effect or physical characteristics change (for example, change in reflectance) caused by the crystal-amorphous phase change.

Newly developed is a hybrid optical disk having both the data reproduce-only area and data recordable area in a single disk. For example, as shown in FIG. 22, an inner track area of an optical disk 100 is allocated as a data reproduce-only area 101, and an outer track area is allocated as a data recordable area 102. As shown in FIGS. 23($a$) and 23($b$), pits 103 (depth: d1, width: w11) are pre-formed in the data area 101. On the other hand, as shown in FIGS. 24($a$) and 24($b$), grooves 105 (depth: d2, width: w21) and lands 106 (width: w22) are formed on the data area 102.

A modulation degree of the above hybrid optical disk varies considerably depending on the kinds of signals. To be more specific, compared with a reproduction signal from the data recordable area where a magneto-optical signal or phase change signal is recorded, a reproduction signal from the data reproduce-only area made of a concave and convex pattern of pits has a higher modulation degree and larger amplitude. For this reason, a high-quality signal is reproduced even from shorter pits.

FIG. 25 shows a relation of a tracking error signal (push-pull signal) amplitude versus an optical depth of the groove on the optical disk, and a relation of a reproduction signal (pit signal) amplitude versus an optical depth of the pit on the optical disk. Let a wavelength of a light beam be $\lambda$, then an amplitude of the push-pull signal reaches its maximum when the groove depth is $\lambda/8$, and the push-pull signal reaches at least half the maximum amplitude when the groove depth is $\lambda/20-\lambda5$. An amplitude of the pit signal reaches its maximum when the pit depth is $\lambda/4$, and the pit signal reaches at least half the maximum amplitude when the pit depth is $\lambda/8-\lambda/4$. Although it is not illustrated in the graph, the pit signal also reaches at least half the maximum amplitude when the pit depth is $\lambda/4-\lambda\times^3/_8\%$, and therefore, the pit signal reaches at least half the maximum amplitude when the pit depth is $\lambda/8-\lambda\times^3/_8$. The larger the signal amplitude, the more stable the tracking servo or signal reproduction. Therefore, the target optical depths of the groove and pit during the processing step are $\lambda/8$ and $\lambda/4$, respectively. The optical depth divided by the substrate's refraction factor n, $d1=\lambda/(4\cdot n)$, $d2=\lambda/(8\cdot n)$ are the depths actually made in the substrate.

The data are recorded through a so-called CLV (Constant Linear Velocity) system. To be more specific, a rotation synchronizing signal is imbedded in the disk, so that when the data are reproduced, the rotation of the disk is controlled in such a manner that the rotation synchronizing signal is in sync with a rotation reference signal indicating a disk rotation speed reference. The rotation synchronizing signal can be imbedded into the disk by more than one methods. For example, the rotation synchronizing signal is imbedded into the concave and convex pattern of pits formed on the track, or wobbled guiding grooves called wobbles formed on the track. Japanese Laid-open Patent Application No. 338066/1994 (Tokukaihei No. 6-338066) discloses an optical disk having guiding grooves composed of grooves whose wobbling frequency switches per rotation and a pit array indicating the switching of the wobbling frequency. In this optical disk, spaces between adjacent guiding grooves are composed of a pit array used as the data reproduce-only area. The above reference discloses another type of optical disk, in which both the side walls of the guiding grooves are wobbled at different frequencies. The rotation synchronizing signal is imbedded at the time the side walls are wobbled.

Further, the above reference discloses a manufacturing method of an optical disk, by which pits having semicircular edge portions with a diameter as long as the pit width are formed using a recording light beam having a spot of substantially the same size as the guiding groove.

To meet the increasing demand for a higher density optical disk, Japanese Laid-open Patent Application No. 314538/1993 (Tokukaihei No. 5-314538) discloses a method of increasing density of a data recording/reproducing optical disk, in which data can be recorded in both the grooves and lands. To be more specific, as shown in FIGS. 26($a$) and 26($b$), an optical disk 120 includes a substrate 122 having thereon concave grooves 123 and the remaining convex lands 124 on its back surface 122$b$. A light beam is incident on the main surface 122$a$ of the substrate 122, and converged onto either the groove 123 or land 124 to record, reproduce, or erase the data. Thus, in this case, a pair of the groove 123 and land 124 forms a guide track 125, and an interval between two adjacent guide tracks 125 is defined as a track pitch.

The side wall 128$a$ of the groove 123 wobbles in accordance with address information, while the other side wall 128$b$ does not. The grooves 123 and lands 124 are designed to have an equal average width. A recording film 126 is sputtered to the back surface 122$b$ of the substrate 122 along its concave and convex pattern. In case of a reflection optical disk, a reflection film 127 is further formed atop of the recording film 126. The wobbles thus made make it possible to detect addresses from both the groove 123 and land 124. However, the reference is silent about the hybrid optical disk.

Japanese Laid-open Patent Application No. 7339/1996 (Tokukaihei No. 8-7339) discloses a hybrid optical disk, in which the guiding grooves (pit-on grooves) composed of grooves having pits thereon are used as the data reproduce-only area, and spaces between the guiding grooves are used as the data recordable area, so that the above two kinds of areas alternate on the disk.

Additionally, shortening pits or recording marks along the track or narrowing a track pitch can also increase density of an optical disk.

The hybrid optical disk 100 of FIGS. 22 through 24($b$) has both the data reproduce-only area and data recordable area. However, as shown in FIGS. 23($a$) and 23($b$), spaces 104

(width: w12) between the adjacent pits 103 in the data reproduce-only area 101 are left as a dead area, thereby making it difficult to increase a recording capacity of the data reproduce-only area 101.

In addition, since the conventional optical disk 100 (see FIGS. 22 through FIG. 24(b)) has the pits 103 (depth: d1, width: w11) and grooves 105 (depth: d2, width: w21) in different concave shapes, the manufacturing process of the optical disk is complicated.

Further, to attain at least half the maximum signal amplitude, the pits and grooves in the optical disk 100 are made to have the target optical depths in a range between $\lambda/8$ and $\lambda \times 3/8$ and in a range between $\lambda/20$ and $\lambda/5$, respectively. However, since the pits and grooves match neither in the depth range nor width, it is very difficult to manage the shapes of the pits and grooves.

As has been explained, the above referred Japanese Laid-open Patent Application No. 338066/1994 (Tokukaihei No. 6-338066) discloses a hybrid optical disk having guiding grooves composed of grooves whose wobbling frequency switches per rotation and a pit array indicating the switching of the wobbling frequency, in which spaces between the adjacent guiding grooves are composed of a pit array used as the data reproduce-only area. This type of optical disk also demands the pit array and grooves in different concave shapes. Thus, like the above case, the manufacturing process is complicated.

In addition, as has been explained, the above-referred Japanese Laid-open Patent Application No. 7339/1996 (Tokukaihei No. 8-7339) discloses a hybrid optical disk, in which the guiding grooves (pit-on grooves) composed of grooves having thereon the pits are used as the data reproduce-only area, and spaces between the adjacent guiding grooves are used as the data recordable area, so that the above two kinds of areas alternate on the disk. This type of optical disk also demands the pits and grooves in different concave shapes and the manufacturing process is complicated as well as the above two cases.

Further, address information is preformatted into this type of optical disk in the concave and convex pattern of pits made on the guiding grooves, and no address information can be detected from the spaces between the adjacent guiding grooves. Thus, to record/reproduce the data into/from the spaces between the adjacent guiding grooves (the data recordable area), the address information must be detected from the guiding grooves (data reproduce-only area). Therefore, 2-beam optical head is indispensable to irradiate light spots respectively on the guiding groove and space between the adjacent guiding grooves concurrently, and an address information detecting signal processing system must be switched from the guiding grooves to the spaces between the adjacent guiding grooves and vice versa. This complicates the arrangement of the optical disk recording/reproducing apparatus.

SUMMARY OF THE INVENTION

It is therefore an object of the present invention to provide a hybrid optical disk with a higher density having both a data reproduce-only area and a data recordable area.

It is another object of the present invention to provide a manufacturing apparats of the above optical disk.

It is still another object of the present invention to provide an optical disk recording/reproducing apparatus suitable for recording/reproducing data into/from the above optical disk.

The above objects are fulfilled by an optical disk of the present invention which is a hybrid optical disk having thereon:

tracks for guiding a light beam, each track being defined by a pair of a guiding groove and a space between adjacent guiding grooves, either side wall of each guiding groove being wobbled in accordance with address information to form wobbles, the other side wall of each guiding groove being extended along the tracks;

a data reproduce-only area in which data are recorded in a pit array composed of a continuous concave pattern of pits; and a data recordable area, and characterized in that:

the guiding grooves are composed of the pits, the guiding grooves are used as the data reproduce-only area; and the spaces between adjacent guiding grooves are used as the data recordable area.

Therefore, a high-density hybrid optical disk can be obtained.

Also, an optical disk manufacturing process can be simplified and shortened.

Further, a shape can be readily managed while the optical disk is manufactured.

The above objects are fulfilled by another optical disk of the present invention, which is a hybrid optical disk having thereon:

tracks for guiding a light beam, each track being defined by a pair of a guiding groove and a space between adjacent guiding grooves, either side wall of each guiding groove being wobbled in accordance with address information to form wobbles, the other side wall of each guiding groove being extended along the tracks;

a data reproduce-only area in which data are recorded in a pit array composed of a continuous concave pattern of pits; and a data recordable area, and characterized in that:

the guiding grooves are composed of the pits and continuous grooves;

a pit array portion of the guiding grooves is used as the data reproduce-only area; and the spaces between adjacent guiding grooves and the continuous grooves of the guiding grooves are used as the data recordable area.

Accordingly, the guiding grooves are fully utilized, so that the largest data recordable area can be formed on the optical disk.

The above objects are fulfilled by still another optical disk of the present invention, which is a hybrid optical disk having thereon:

tracks for guiding a light beam, each track being defined by a pair of a guiding groove and a space between adjacent guiding grooves, either side wall of each guiding groove being wobbled in accordance with address information to form wobbles, the other side wall of each guiding groove being extended along the tracks;

a data reproduce-only area in which data are recorded in a pit array composed of a continuous concave pattern of pits; and a data recordable area, and characterized in that:

the guiding grooves are composed of the pits, and control information for controlling recording/ reproduction of the data are recorded in at least an inner-most track area or an outer-most track area of the optical disk using at least the wobbles or pits of the guiding grooves.

Accordingly, the optical disk manufacturing process can be simplified.

In addition, since the control information is recorded in the same manner as the address information, no additional detecting circuit is necessary, thereby simplifying the circuitry of an optical disk recording/reproducing apparatus.

The above objects are fulfilled by still another optical disk of the present invention, which is a hybrid optical disk having thereon:

tracks for guiding a light beam, each track being defined by a pair of a guiding groove and a space between adjacent guiding grooves, either side wall of each guiding groove being wobbled in accordance with address information to form wobbles, the other side wall of each guiding groove being extended along the tracks;

a data reproduce-only area in which data are recorded in a pit array composed of a continuous concave pattern of pits; and a data recordable area, and characterized in that:

the guiding grooves are composed of the pits and continuous grooves, and control information for controlling recording/ reproduction of the data is recorded in at least an inner-most track area or an outer-most track area of the optical disk using the wobbles of the continuous grooves of the guiding grooves.

Accordingly, the optical disk manufacturing process can be simplified.

In addition, since the control information is recorded in the same manner as the address information, no additional detecting circuit is necessary, thereby simplifying the circuitry of an optical disk recording/reproducing apparatus.

Further, since the lead-in area or lead-out area is composed of the grooves used as the data recordable area, the data in the control information that need the updating (address management information of the data recordable area, etc.) can be recorded in the grooves using the magneto-optical signal, phase change signal, or the like, thereby making it possible to use the track of the optical disk efficiently.

The above objects are fulfilled by an optical disk manufacturing apparatus of the present invention which records data into an optical disk by forming pits through irradiation of a light beam from an irradiating section to a track formed on an optical disk substrate after adjusting a light amount of all the light beams for respective data to be recorded by means of a light amount adjusting section, and characterized in that:

the irradiating section irradiates N (N is an integer, and 2≦N) light beams; and the light amount adjusting section adjusts a light amount of all the light beams, and further characterized by additionally being furnished with:

a light converging section for converging each light beam onto an optical disk to form a converged light spot having a spot size of substantially 1/M (M is an integer, and 2≦M≦N) of a pit width the optical disk; and a wobbling section for wobbling L (L is an integer, and 0<L<N) out of the N light beams along the track in accordance with addresses of the respective data.

According to the above arrangement, an optical disk can be manufactured by a simple manufacturing process.

Also, an optical disk manufacturing process can be simplified and shortened.

Further, since almost rectangle pits can be formed, the signal quality is improved.

The above objects are fulfilled by an optical disk recording/reproducing apparatus of the present invention, which drives any of the above optical disks by means of a motor and demodulates a reproduction signal obtained from the optical disk based on a reproduction reference frequency by means of a data reproducing section, is characterized by being furnished with:

a recording section for recording data into said data recordable area at linear recording density different from liner recording density of said data reproduce-only area;

a rotation control section for controlling a revolution of the motor based on a rotation reference signal;

a reference signal generating section for generating the rotation reference signals having different frequencies for the data reproduce-only area and data recordable area, respectively, in accordance with the linear recording density used for recording by the recording section;

a signal selecting section for selecting either data area; and a reference signal switching section for switching the rotation reference signals generated by the reference signal generating section in accordance with the data area selected by the signal selecting section, so that the reproducing reference frequency remains at a constant level.

Accordingly, the reproduction circuitry can be simplified.

The above objects are fulfilled by a recording/reproducing apparatus of the present invention, which records/ reproduces data into/from any of the above optical disks through a CLV control system based on a rotation synchronizing signal, is characterized by being furnished with:

a signal selecting section for selecting either data area;

a first rotation synchronizing signal generating section for generating a first rotation synchronizing signal out of a pit signal recorded into the pits;

a second rotation synchronizing signal generating section for generating a second rotation synchronizing signal out of a wobble signal recorded into the wobbles; and a synchronizing signal selecting section for, when the signal selecting section has selected the data reproduce-only area, activating the first rotation synchronizing signal generating section to generate the first rotation synchronizing signal, and when the signal selecting section has selected the data recordable area, the synchronizing signal selecting section for activating the second rotation synchronizing signal generating section to generate the second rotation synchronizing signal.

Accordingly, the data can be reproduced in a satisfactory manner from the high-density optical disk under the CLV control system.

For a fuller understanding of the nature and advantages of the invention, reference should be made to the ensuing detailed description taken in conjunction with the accompanying drawings.

BRIEF DESCRIPTION OF THE DRAWINGS

FIGS. 2(a) through 2(f) are cross sections showing a mastering process of a substrate of the optical disk;

FIG. 15(a) is a plan view and FIG. 15(b) is a cross section taken on line G—G;

FIG. 16(a) is a plan view and FIG. 16(b) is a cross section taken on line H—H;

FIGS. 23 (a) and 23 (b) show the data reproduce-only area of the conventional optical disk, and FIG. 23(a) is a plan view and FIG. 23(b) is a cross section taken on line D—D;

FIG. 24(a) is a plan view and FIG. 24(b) is a cross section taken on line E—E;

FIG. 26(a) is a plan view and FIG. 26(b) is a cross section taken on line F—F.

DETAILED DESCRIPTION OF THE PREFERRED EMBODIMENTS (Embodiment 1)

The following description will describe an example embodiment of the present invention.

Figure 1:
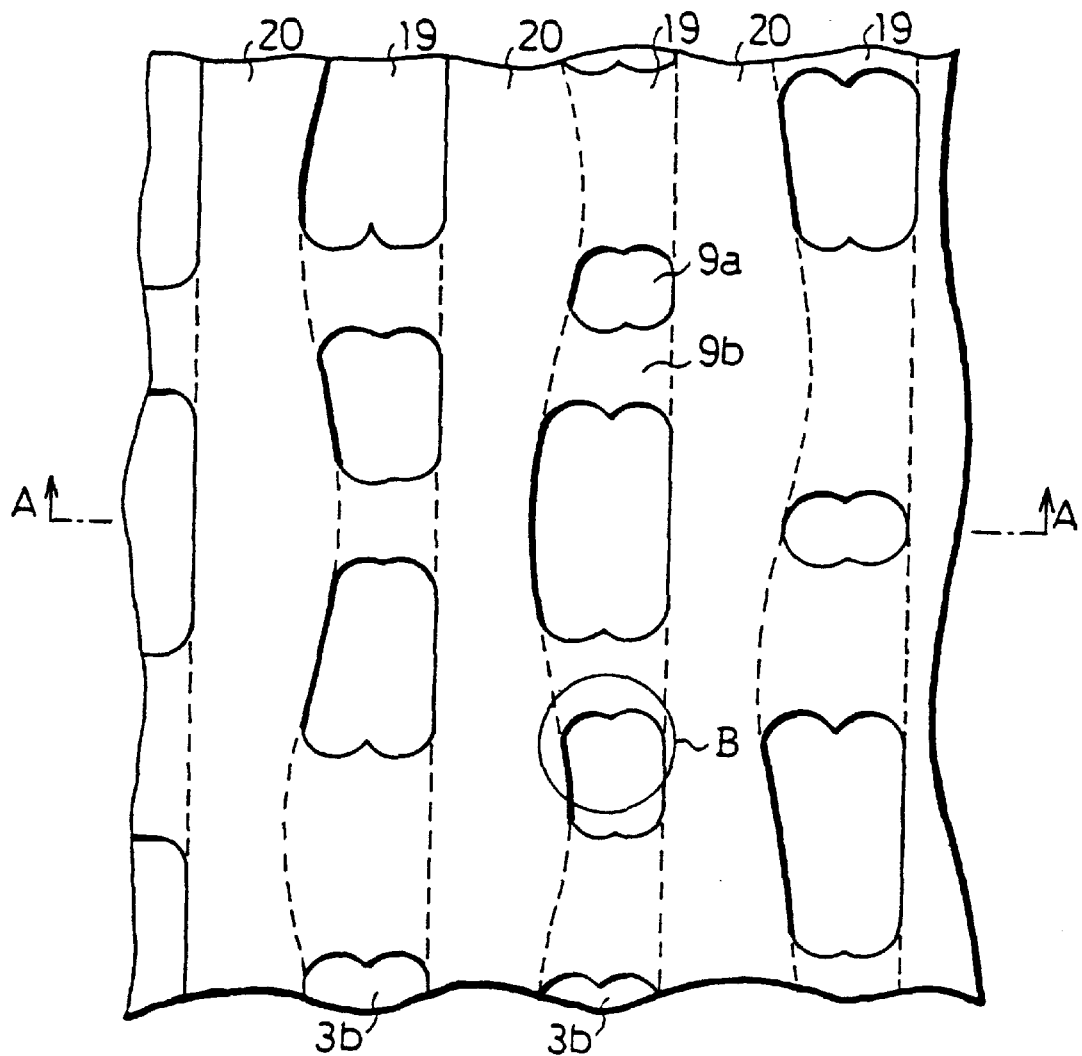
FIGS. 1(*a*) and 1(*b*) show a major part of an example optical disk of the present invention, and FIG. 1(*a*) is a plan view and FIG. 1(*b*) is a cross section taken on line A—A.
Figure 1:
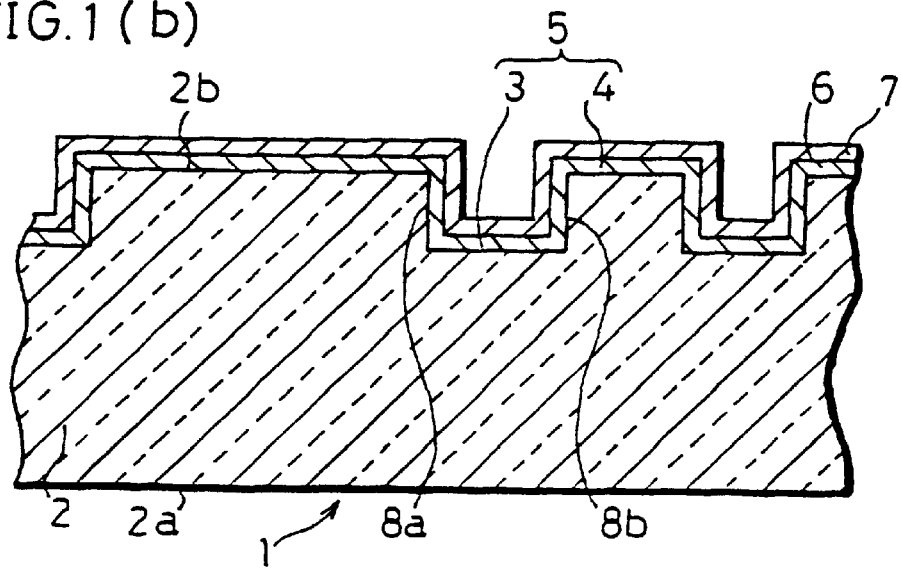

As shown in FIGS. 1(a) and 1(b), an optical disk 1 of the present embodiment includes a substrate 2 having thereon concave guiding grooves 3 and remaining convex spaces 4 between the adjacent guiding grooves 3 (hereinafter, referred to as the groove spaces 4) on its back surface 2b. The substrate 2 is made of a light transmitting material, such as glass or plastic. A light beam incident on a main surface 2a of the substrate 2 is converged on the guiding groove 3 or groove space 4 to record, reproduce, or erase data. A pair of the guiding groove 3 and groove space 4 forms a guide track 5, and an interval between the adjacent guide tracks 5 is defined as a track pitch.

The guiding groove 3 is composed of a pit array 3b having pits (concave portion) 9a and spaces 9b (convex portion) between the adjacent pits 9a (which are referred to as pit spaces 9b, hereinafter). A side wall 8a of the guiding groove 3 wobbles in accordance with address information, while the other side wall 8b does not. The guiding grooves 3 and groove spaces 4 are designed to have an equal average width. A recording film 6 is sputtered to the back surface 2b of the substrate 2 along the concave and convex pattern formed thereon. In case of a reflection optical disk, a reflection film 7 is further formed over the recording film 6.

Address information is preformatted in the guiding grooves 3 as a wobble signal in the form of the wobbles of the side wall 8a. The data are recorded, reproduced, or erased at a specific position on the optical disk 1 using the above preformatted address information. A wobbling carrier frequency is set to about 50 kHz, for example, so that it does not give any adverse effect to a bandwidth of a tracking servo of some kHz (cut-off frequency 2 kHz) or a bandwidth of a reproduction signal or record/reproduction signal of some MHz (1 MHz–5 MHz).

Figure 25:
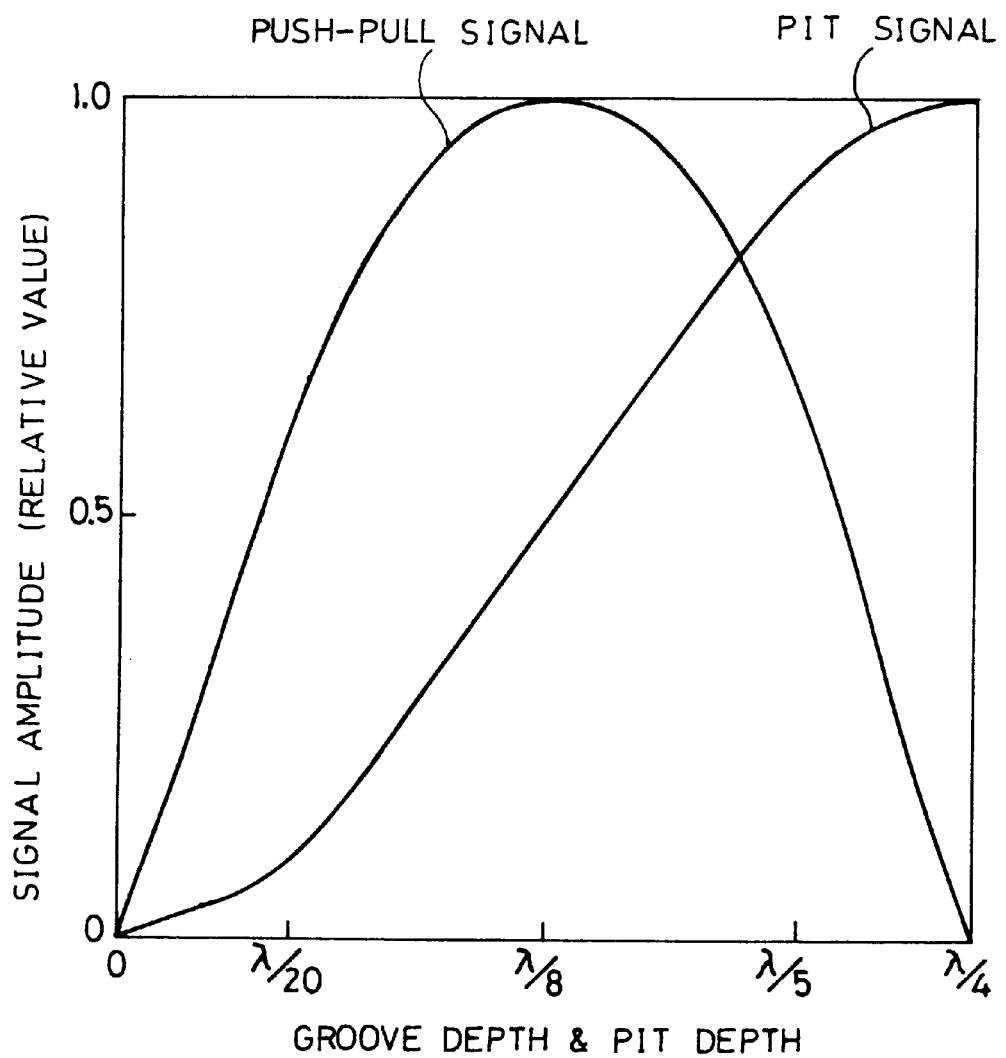
FIG. 25 is a graph explaining a relation of a push-pull signal amplitude versus a groove depth and a relation of a pit signal amplitude versus a pit depth of the present invention.
Figure 26:
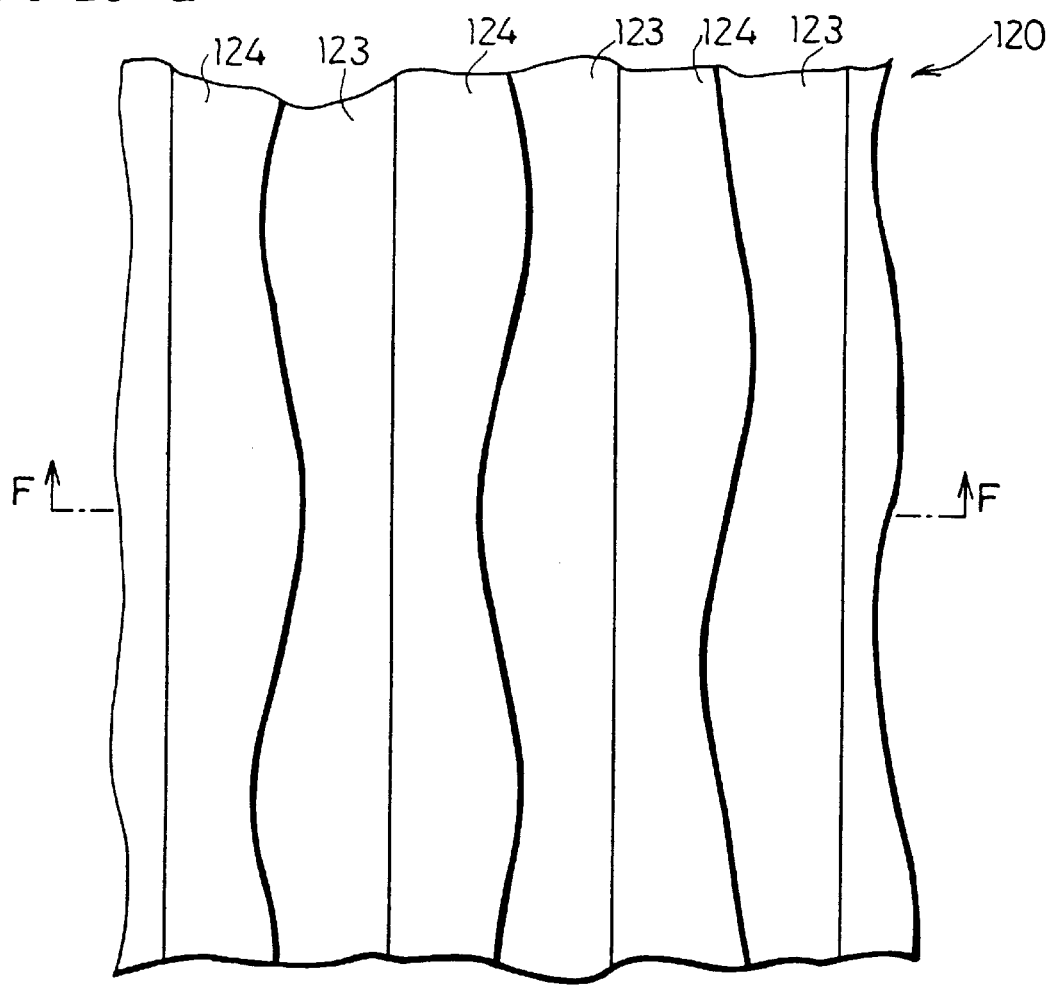
FIGS. 26(a) and 26(b) show a major part of a conventional optical disk, with which data are recorded/reproduced into/from both the grooves and lands.
Figure 26:
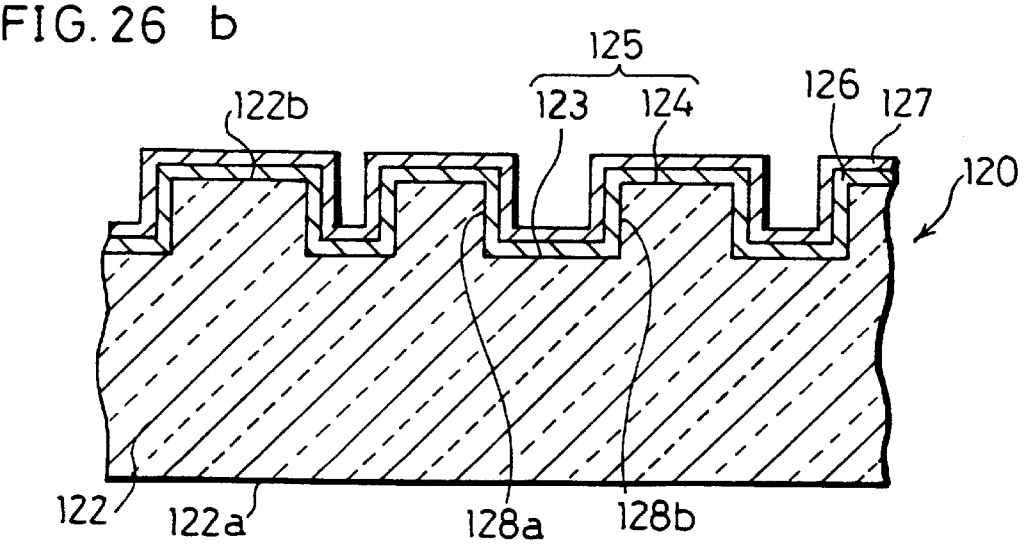

An optical depth of the pit 9a of the guiding groove 3 is set to a range between $\lambda/8$ and $\lambda/5$. As is understood from FIG. 25, limiting the depth in the above-specified range makes it possible to detect both a push-pull signal and a pit signal, while both the signals attaining at least half the maximum amplitude. Accordingly, both the wobble signal and pit signal can be reproduced with a better quality, and the tracking servo is performed and data are reproduced in a more stable manner.

As shown in FIGS. 1(a) and 1(b), the edge portions of each pit 9a have such a shape that two circles (arcs) each having a diameter of substantially half the pit width, overlap each other. Thus, the pits 9a is almost a rectangle and a boundary between the pit 9a and pit space 9b becomes more distinctive, thereby upgrading the quality of a reproduction signal. Further, even if a light beam is shifted from the center of the guiding groove due to a tracking error, the boundary position between the pit 9a and pit space 9b hardly varies, thereby making it possible to maintain the quality of the reproduction signal (no increase of jitter)

In the optical disk 1, pit array 3b of the guiding grooves 3 are used as a data reproduce-only area 19, and the groove spaces 4 are used as a data recordable area 20. Data are reproduced from the data reproduce-only area 19 using a pit signal, while data are recorded/reproduced into/from the data recordable area 20 using a magneto-optical signal or phase change signal.

The CLV (Constant Linear Velocity) system is adopted as an optical disk rotation control method to increase a recording capacity. A rotation synchronizing signal used in the CLV rotation control is produced out of the pit signal in the data reproduce-only area 19 composed of the pit array 3b of the guiding grooves 3. Thus, even if the pit array 3b and the wobbles of the side wall 8a of the guiding groove 3 are formed at different timings and a wobbling frequency error occurs, an accurate rotation synchronization is realized. On the other hand, a rotation control signal is produced out of the wobble signal in the data recordable area 20 composed of the groove spaces 4. Thus, since data are recorded or reproduced using the wobble signal as a reference, even when there is a wobbling frequency error, it hardly affects the rotation synchronization of the reproduction signal.

Here, a data recording/reproducing operation using a magneto-optical signal or phase change signal with the optical disk 1 will be explained with reference to FIGS. 8 and 12.

A magneto-optical signal is recorded/reproduced in the following manner. That is, a laser beam is emitted from a semiconductor laser 51 of an optical head 50 of FIG. 8 at a high power to make a light spot on the optical disk 1 through an objective lens 54, so that a temperature of a microscopic domain on the recording film 6 made of a magneto-optical material is raised to at least a predetermined level. As a result, a high temperature domain that has lost a coercive force is formed on the recording film 6.

Under these conditions, an external magnetic field is applied by an unillustrated magnetic head provided in an opposing position to the objective lens 54 with the optical disk 1 inbetween. When the high temperature domain is cooled to a normal temperature, a magnetization direction of the recording film 6 is fixedly aligned along the direction of the external magnetic field.

The above recording method includes two ways: one is magnetic field modulation recording and the other is optical modulation recording. To be more specific, in the former, a laser beam is emitted from the semiconductor laser 51 at a high power with constant intensity to modulate the magnetic field of the magnetic head, and in the latter, a laser beam is emitted from the semiconductor laser 51 at a high power with an application of an initializing magnetic field to align the magnetization direction to one specific direction first, and thence light intensity of a laser beam from the semiconductor laser 51 is modulated with an application of a magnetic field having a direction opposite to the direction of the initializing magnetic field.

To reproduce the magneto-optical signal, light intensity of a laser beam emitted from the semiconductor laser 51 to the optical disk 1 is reduced compared with at the time of data recording. A polarization plane of reflected light of the linearly polarized laser beam incident on the recording film 6 rotates, due to the magneto-optical effect, in different directions depending on the magnetization direction of the recording film 6. The variation of the polarized state is converted into a light amount variation using an analyzer (a ½%-wavelength plate 60 and a polarization beam splitter 61), which is detected by photodetectors 62 and 63. The light amount variation is smaller than a light amount variation of the pit signal.

On the other hand, the phase change signal is recorded/reproduced in the following manner. That is, a laser beam is emitted from the semiconductor laser 51 of the optical head 50 of FIG. 12 at a high power to form a light spot and raise a temperature of a microscopic domain on the recording film 6 made of a phase change material to at least a predetermined level. As a result, a high-temperature microscopic domain is formed on the recording layer 6. When the microscopic domain is cooled abruptly, it turns into crystal, and when the same is cooled gradually, it turns into amorphous. Therefore, a signal can be recorded by exploiting the crystal-amorphous phase change if a phase change material having different reflectance in the crystal phase and amorphous phase is used.

To reproduce the phase change signal, light intensity of a laser beam emitted from the semiconductor laser 51 to the recording film 6 is reduced compared with at the time of data recording. Like the pit signal, the phase change signal is detected by a photodetector 58 from the reflected light based on change in reflectance in the form of the light amount variation. The light amount variation of the phase change signal is smaller than the light amount variation of the pit signal.

Next, how each kind of signal is reproduced from the optical disk 1 of the present embodiment will be explained with reference to FIGS. 1(a) and 1(b).

(1) Wobble Signal

To being with, a reproduction principle of a wobble signal will be explained. The center of the guiding groove 3 also wobbles along the wobbles of the side wall 8a of the guiding groove 3. Whereas a trace of a light beam B does not follow the wobbling center of the guiding groove 3 and moves forward along an average center of the guiding groove 3. In short, the trace of the light beam B moves forward along the track faithfully. This causes a tracking error. Therefore, the wobble signal is detected in the following manner:

a difference signal between outputs from the photodetector divided into halves by a dividing line along the track is computed through the push-pull method; and a wobbling frequency component is extracted from the resulting tracking error signal through a high-pass filter (HPF).

Alternatively, reflected light amount variation caused by different widths of the wobbling guiding groove 3 is used. That is, the wobble signal can be detected by extracting a wobbling frequency component from a total signal, which is a sum of the outputs from the photodetector, through the high-pass filter (HPF).

While the light beam B moves forward on the pit array 3b of the guiding grooves 3, a high frequency component caused by the pit 9a is mixed into the wobble signal. However, such an unwanted component can be removed using a low-pass filter (LPF). The pit spaces 9b denoted by a dotted line on the pit array 3b exist on the same plane as the groove spaces 4. Thus, the guiding grooves 3 are disconnected at this portion, and the information contained in the wobbles at the disconnected portion is missing. However, let the maximum pit of the pit signal be 2.5 $\mu$m, then the cycle of the pit signal is 5 $\mu$m (1 MHz) and a corresponding wobbling cycle is as large as 100 $\mu$m (50 kHz). Thus, the above missing data hardly affect the reproduction.

While the light beam B moves forward on the groove spaces 4, the information contained in the wobbles is missing at the pit space 9b denoted by a dotted line because of the pit array 3b of the adjacent guiding groove 3. However, this hardly affect the reproduction for the same reason explained above.

Since a wobbling carrier frequency is selectively set to a bandwidth such that does not give any adverse effect to a bandwidth of the tracking servo or a bandwidth of the reproduction signal or recording/reproduction signal, the wobbling carrier frequency can be separated from the tracking error signal or reproduction signal and recording/reproduction signal by a filter.

(2) Phase Chance Signal

While a phase change signal is recorded into the groove spaces 4 used as the data recordable area 20, a wobble signal component is mixed into the phase change signal. However, since these two kinds of signals have different bandwidths, such an unwanted component can be removed using a high-pass filter. In case of a narrow track pitch, a pit signal is mixed into the phase change signal as crosstalk under the influence of the pit array 3b of the adjacent guiding groove 3. Since the pit signal and phase change signal have the same bandwidth, the unwanted crosstalk can not be removed using a filter. Therefore, a sufficiently large track pitch must be secured to eliminate any adverse effect caused by the crosstalk.

(3) Magneto-optical Signal

While a magneto-optical signal is recorded into the groove spaces 4 used as the data recordable area 20, a wobble signal component is mixed into the magneto-optical signal. However, since these two kinds of signals have different bandwidths, such an unwanted component can be removed using a high-pass filter. In case of a narrow track pitch, a pit signal is mixed into the magneto-optical signal as crosstalk under the influence of the pit array 3b of the adjacent guiding groove 3. Since the pit signal and magneto-optical signal have the same bandwidth, the unwanted crosstalk can not be removed using a filter. However, since a difference signal between the two signals obtained by two photoreceiving sections is computed, the light amount variation caused by the pit signal can be reduced.

(4) Pit Signal

In case that the phase change signal is recorded into the adjacent groove space 4, the phase change signal is mixed into the pit signal as crosstalk. Since the phase change signal and pit signal have the same bandwidth, the unwanted crosstalk can not be removed using a filter. Therefore, a sufficiently large track pitch must be secured to eliminate any adverse effect caused by the crosstalk. On the other hand, in case that the magneto-optical signal is recorded into the adjacent groove space 4, the magneto-optical signal is mixed into the pit signal as crosstalk. However, the crosstalk is negligible because the magneto-optical signal does not change reflectance.

In view of the foregoing, when the data reproduce-only area 19 and data recordable area 20 alternate like above, a combination of the pit signal and magneto-optical signal is preferred. Since each does not affect the other, the recording density can be increased compared with shortening the track pitch either in the data reproducing area 19 or data recordable area 20 alone.

Note that, however, in case of a combination of the pit signal and phase change signal, the crosstalk can be suppressed by separating the bandwidth of each signal by changing each signal's linear recording density (linear velocity). For example, assume that a 5 MHz-signal is recorded using a pit signal having a linear velocity of 5 m/s and a phase change signal having a liner velocity of 10 m/s. Then, a physical length (pit length) of the pit signal is 0.5 µm and a physical length (mark length) of the phase change signal is 1.0 µm.

When the data are reproduced from the data reproduce-only area at a linear velocity of 5 m/s, 5 MHz is the frequency of the pit signal, whereas 2.5 MHz is the frequency of the phase change signal. On the other hand, when the data are reproduced from the data record and reproduce area 20 at a linear velocity of 10 m/s, 5 MHz is the frequency of the phase change signal, whereas 10 MHZ is the frequency of the pit signal. Thus, since the reproduction signal has different frequencies in the adjacent data areas, crosstalk can be reduced by removing unwanted frequency component using an adequate band-pass filter.

It is needless to say that the record/reproduction signal has not only one frequency, but a frequency bandwidth. Thus, assume that a frequency bandwidth is in a range between 2.5 MHz and 5 MHz in the above case and the data are reproduced from the data reproduce-only area at a linear velocity of 5 m/s, then 2.5 MHz–5 MHz is the frequency bandwidth of the pit signal, whereas 1.25 MHz–2.5 MHz is the frequency bandwidth of the phase change signal. On the other hand, when the data are reproduced from the data recordable area 20 at a linear velocity of 10 m/s, 2.5 MHz–5 MHz is the frequency of the phase detecting signal, whereas 5 MHz–10 MHz is the frequency of the pit signal. Thus, crosstalk can be reduced by removing unwanted frequency component using a bandpass filter such that allows a frequency component of 2.5 MHz–5 MHz to pass. Even though the frequency bandwidths are not separated completely, crosstalk can be reduced by reducing a frequency overlapping area. This technique is also applicable for a combination of the pit signal and magneto-optical signal.

In general, the pit signal has a higher modulation degree and larger amplitude than the magneto-optical signal or phase change signal. Because of such a difference in modulation degree, the pit signal and magneto-optical signal or phase change signal have different upper limits of the linear recording density specified by an error rate. That is to say, a high-quality pit signal can be obtained even if the pit is short. Thus, as has been explained, the linear recording density can be raised in the data reproduce-only area 19 higher than the data recordable area 20 up to an optimal level to fully utilize the data reproduce-only area 19, thereby making high-density data recording possible. In contrast, the conventional hybrid optical disk is arranged in such a manner that the data reproduce-only area and data recordable area have the same linear velocity and same linear recording density, which makes it almost impossible to increase a recording capacity.

In addition, as was explained in the case of reproducing the wobble signal, the shorter the pit 9a by increasing the linear recording density of the data reproduce-only area 19, the less an amount of missing information in the wobbles, and hence, the more satisfactorily the data can be read from the wobble signal.

FIGS. 1(a) and 1(b) illustrate an optical disk whose guiding grooves 3 wobble at the side wall 8a alone; however, the guiding grooves 3 may wobble at the other side wall 8b alone, instead.

(Embodiment 2)

The following description will describe another example embodiment of the present invention. Hereinafter, like components are labeled with like reference numerals with respect to Embodiment 1 and the description of these components is not repeated for the explanation's convenience.

Figure 14:
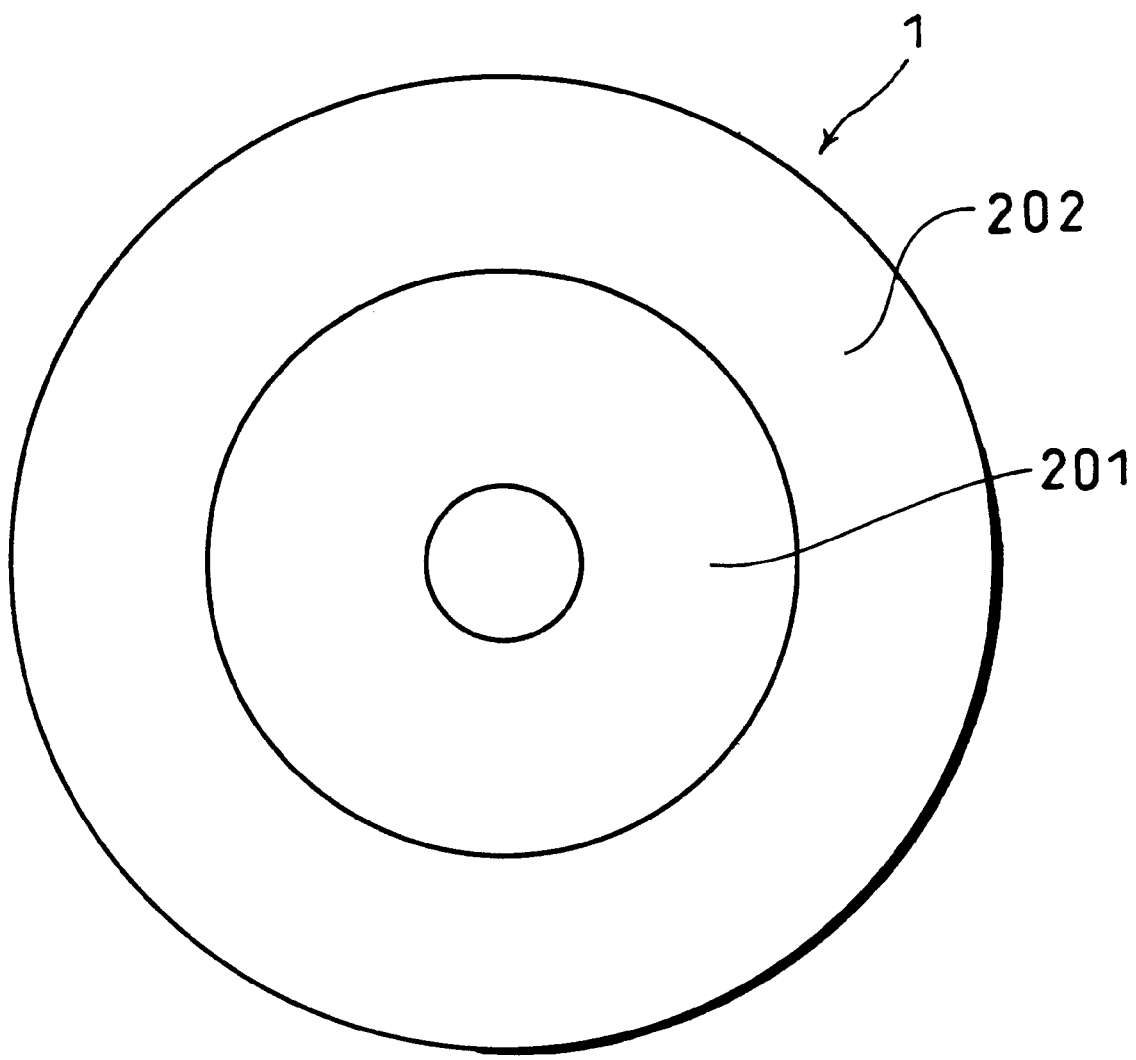
FIG. 14 is a plan view showing an optical disk in accordance with another example embodiment of the present invention.

As shown in FIG. 14, the optical disk 1 is divided into two track areas in a radial direction in the present embodiment.

Figure 15:
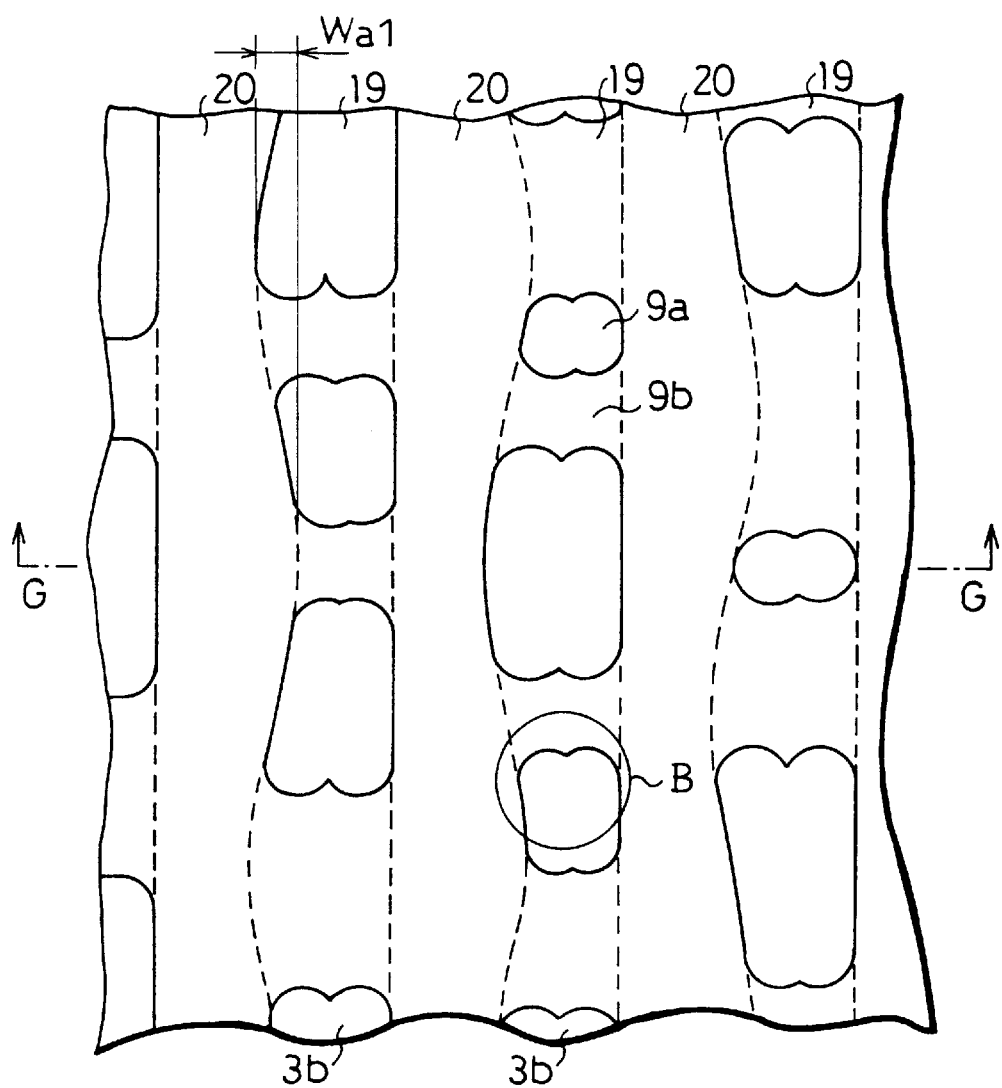
FIGS. 15(a) and 15(b) show a major part of the example optical disk of FIG. 14.
Figure 15:
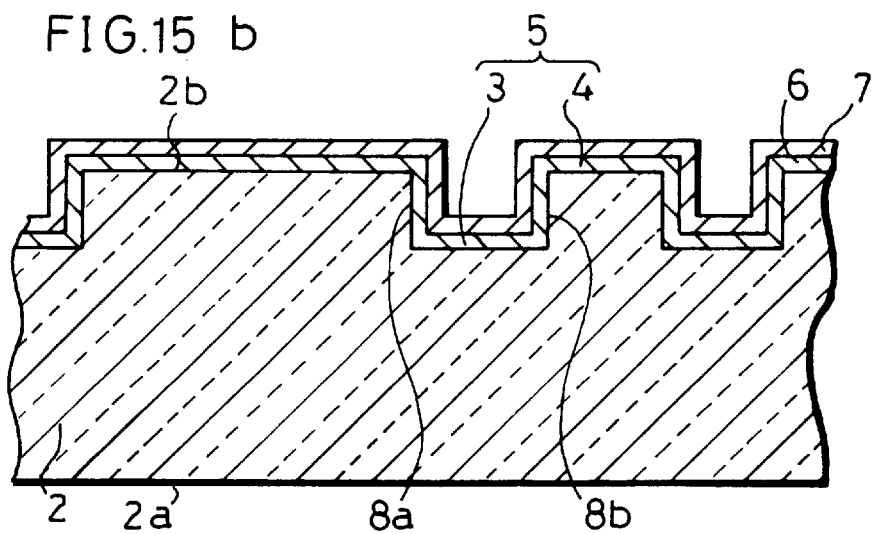

As shown in FIGS. 15(a) and 15(b), the guiding grooves 3, composed of the pit array 3b having a wobble amplitude of wa1, are formed on an inner track area 201. The guiding grooves 3 and groove spaces 4 are used as the data reproduce-only area 19 and data recordable area 20, respectively.

Figure 16:
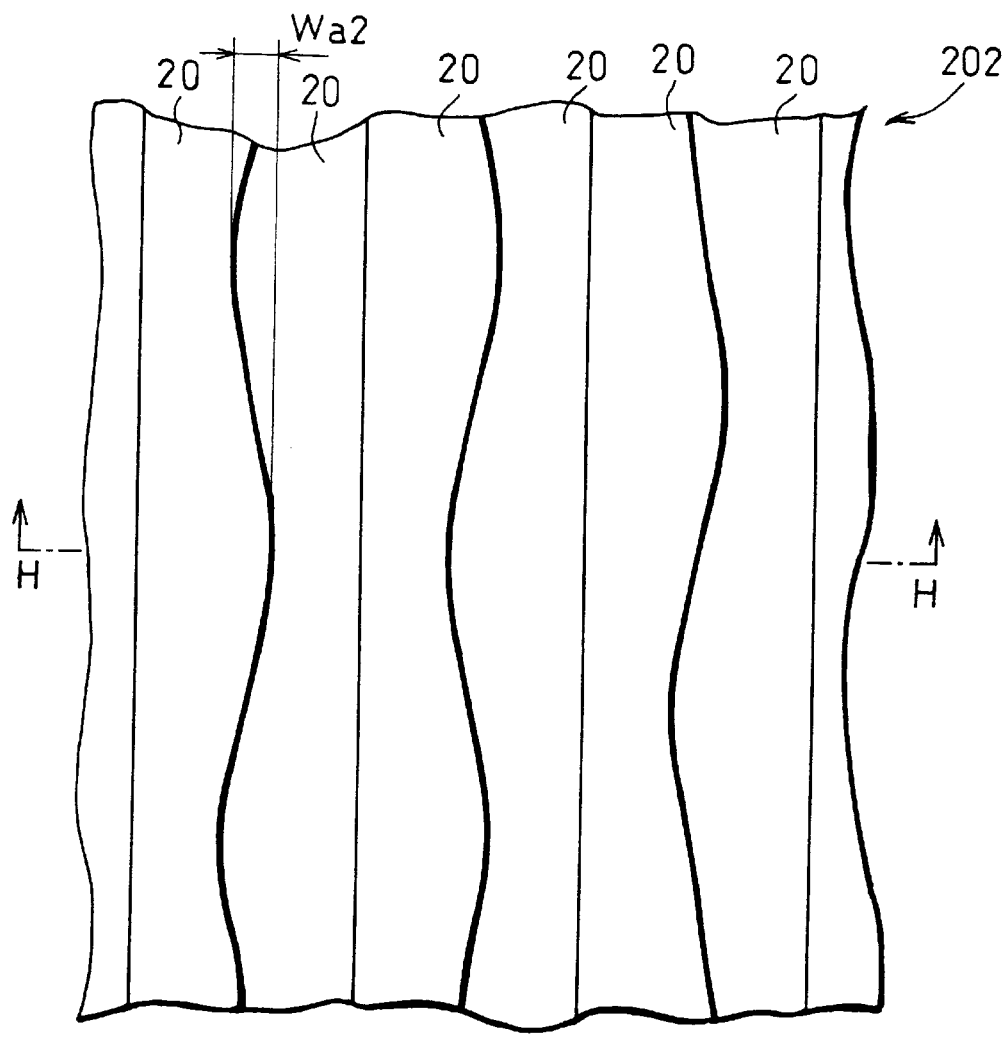
FIGS. 16(a) and 16(b) show another major part of the example optical disk of FIG. 14.
Figure 16:
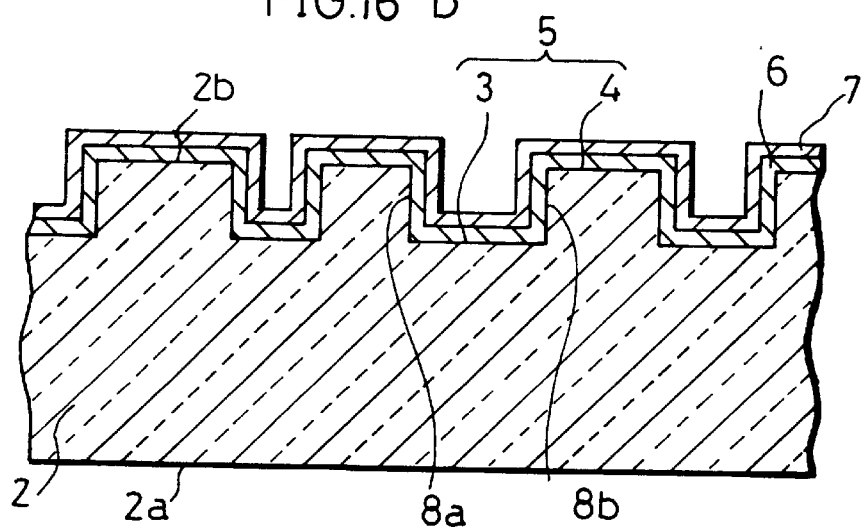

On the other hand, as shown in FIGS. 16(a) and 16(b), the guiding grooves 3 are formed on an outer track area 202 in the form of continuous grooves having a wobble amplitude wa2. Both the guiding grooves 3 and groove spaces 4 are used as the data recordable area 20.

When the data reproduce-only area 19 does not demand entire guiding grooves 3, the pit array 3b is made on a part of the guiding grooves 3 to be used as the data reproduce-only area 19, and instead of the pit array 3b, continuous grooves are formed on the remaining part to be used as the data recordable area 20. Since the recording film 6 and reflecting film 7 are formed over both the groove spaces 4 and guiding grooves 3, the data can be recorded into the guiding grooves 3 as well. This arrangement makes it possible to secure the largest data recordable area 20 on the optical disk 1.

Next, how a wobble signal is reproduced from the optical disk 1 of the present embodiment will be explained with reference to FIGS. 14 through 17(c).

To begin with, a comparison case where the wobble amplitude wa1 and wobble amplitude wa2 are equal will be explained.

When the light beam B moves forward on the pit array 3b of the guiding grooves 3 formed on the track area 201, the guiding grooves 3 are disconnected and hence information contained in the wobbles are missing at the pit spaces 9b denoted by a broken line in FIG. 15(a) because the pit spaces 9b and groove spaces 4 are on the same plane. A reproduction signal under these conditions has a waveform 203 as shown in FIG. 17(a).

When the light beam B moves forward on the continuous grooves of the guiding grooves 3 in the track area 202, the guiding grooves 3 are not disconnected at any point and no information is missing. A reproduction signal under these conditions has a waveform 204 as shown in FIG. 17(b).

Figure 17:
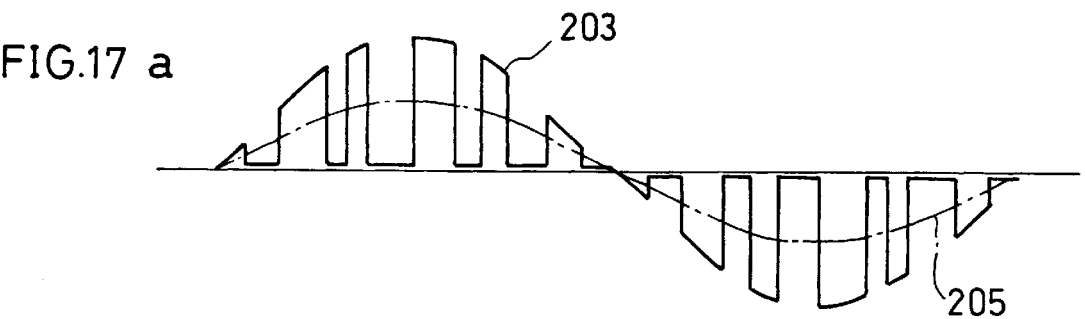
FIGS. 17(a) through 17(c) are views explaining a waveform of a wobble signal obtained from the optical disk of FIG. 14.
Figure 17:
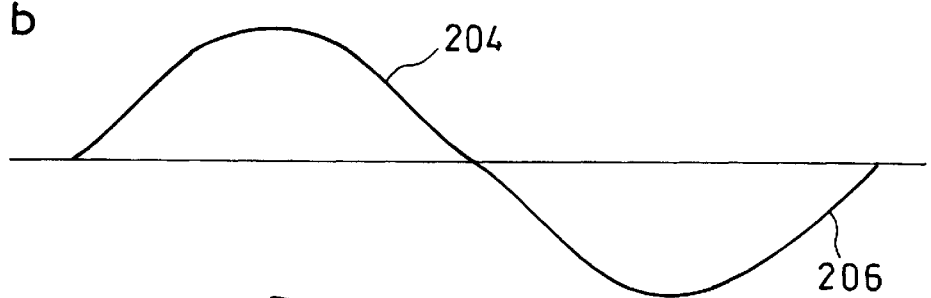
Figure 17:
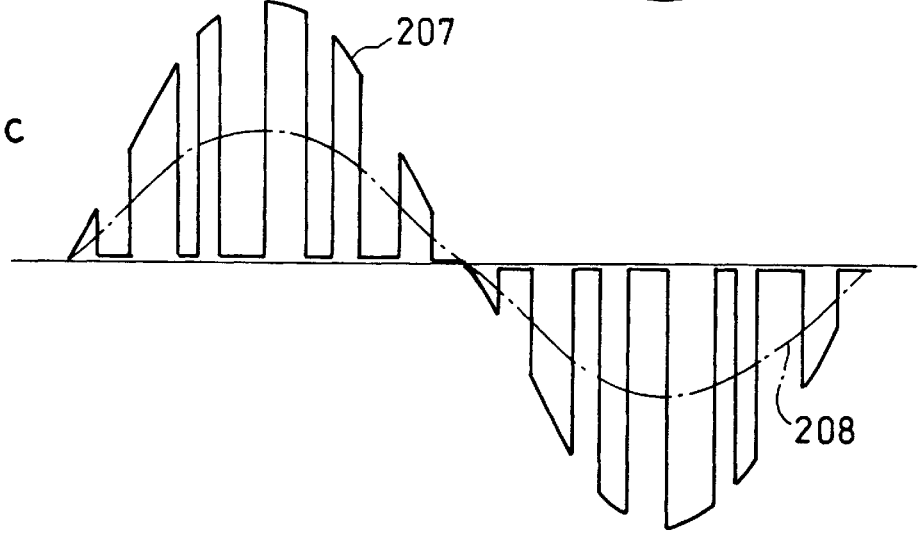

After the wobble signal reproduced from the track area 201 passes through a low-pass filter (LPF) to remove a high frequency component mixed thereinto by the pit array 3b, the waveform 203 transforms to a waveform 205 as shown in FIG. 17 (a) and the signal amplitude becomes smaller.

On the other hand, since the waveform 204 of the wobble signal reproduced from the track area 202 does not contain any high frequency component caused by the pit array 3b, the waveform 204 transforms to a waveform 206 as shown in FIG. 17(b) after the reproduced wobble signal has passed through the low-pass filter (LPF), and the signal amplitude remains the same.

Next, how a wobble signal is reproduced from the optical disk of the present embodiment will be explained.

It is not preferable that the wobble signal detected by the optical head varies significantly in signal level, because it triggers an address detection error. To solve the above problem, it is arranged herein that the wobble width wa1 in the track area 201 is larger than the wobble amplitude wa2 of the track area 202.

To be more specific, the pit array 3b includes the pits 9a and pit spaces 9b having the same average length to reduce the DC components in a general modulation method. Thus, as shown in FIG. 17(a), when the wobble amplitude is constant, the waveform 205 becomes about half the waveform 203. Thus, it is arranged that the wobble amplitude wa1 in the track area 201 becomes twice the wobble amplitude wa2 in the track area 202. Accordingly, the waveform of the wobble signal transforms to a waveform 207 as shown in FIG. 17(c). Consequently, a waveform 208 after the wobble signal has passed through the low-pass filter (LPF) has the same amplitude as a signal amplitude of the waveform 206 of FIG. 17(b).

FIGS. 14 through 16(b) show an example in which the guiding grooves composed of the pit array 3b are formed in the inner track area 201 and the guiding grooves composed of the continuous grooves are formed in the outer track area 202. However, the guiding grooves composed of the pit array 3b may be formed in the outer track area 202 and the guiding grooves composed of the continuous grooves in the inner track area 201. Further, the pit array can be formed in any area stretching from the inner-most peripheral to the outer-most peripheral. Moreover, the pit array may be made in more than one area.

The rotation synchronizing signal can be produced out of the wobble signal without using any pit signal in the data reproduce-only area 19 composed of the pit array 3b in the optical disk shown in FIGS. 1(a), 1(b), or FIGS. 14 through 16(b). In this case, the pit signal only has to record the reproduction data, thereby promoting the data utilization and realizing a recording capacity with a higher density.

In particular, the optical disk of FIGS. 14 through 16(b) takes a rotation synchronization always using the wobble signal. Thus, it is no longer necessary to switch the rotation synchronization signal detecting methods when the guiding groove 3 switches from the pit array 3b to the continuous groove at the boundary between the track area 201 and track area 202, thereby enabling smooth data area switching.

Also, although the quality of the wobble signal may be slightly degraded because of the missing wobbling information at the disconnected guiding grooves, this can be compensated by making a wobble amount of the pit array 3b in the track area 201 twice or more of a wobble amount of the guiding grooves 3 in the track area 202. Herein, crosstalk of the wobble signal increases with respect to the data recording/reproducing action with the groove spaces 4 in the track area 201. Also, crosstalk caused by the pit signal increases when the wobbling edge in the width direction of the pit approaches to the groove spaces 4. Thus, it is preferable that the data are not recorded/reproduced into/ from the groove spaces 4 and that the track area 201 is used as the data reproduce-only area. By so doing, the wobble signal is reproduced from the data reproduce-only area in a more reliable manner.

In case where data related to information as to the data reproduce-only area 201 are recorded, the data are recorded into the guiding grooves 3 in the track area 202. By so doing, an access between the track area 201 and track area 202 can be established smoothly without changing the polarity of the tracking servo. For example, map data are pre-recorded in the data reproduce-only area 201 while the updated map data are recorded into the track area 202. This accelerates the access between the data reproduce-only area 201 and data recordable area 202, so that the map on the output screen can be updated promptly.

Note that, in the above explanation, the guiding grooves in the track areas 201 and 203 have the same depth, and changing the depths of the guiding grooves in each of the track areas 201 and 203 can upgrade the quality of the wobble signal even if a wobble amount in the former area is up to twice the wobble amount in the latter area.

(Embodiment 3)

The following description will describe a further example embodiment of the present invention. Hereinafter, like components are labeled with like reference numerals with respect to Embodiments 1 and 2, and the description of these components is not repeated for the explanation's convenience.

Herein, the pit array 3b in the data reproduce-only area 19 is narrowed, and the groove spaces 4 between the adjacent pit array 3b in the data recordable area 20 are widened. This is because the pit signal having a large modulation degree can attain a sufficient signal level even if the pit 9a is narrowed, whereas the magneto-optical signal or phase change signal having a low modulation degree can not attain a sufficient signal level unless a record marks are widened.

For example, data are reproduced from two kinds of optical disks ① and ② using an optical head comprising a semiconductor laser having a wave length λ of 680 nm and an objective lens having an NA (Numerical Aperture) of 0.55. The details of the two optical disks are as follow:

|   |   | Disk ① | Disk ② |
|---|---|---|---|
| (1) | average guiding groove width | 0.7 μm | 0.5 μm |
| (2) | average groove space width | 0.7 μm | 0.9 μm |
| (3) | guiding grooves depth | 0.06 μm | 0.06 μm |
| (4) | a wobble amount of guiding grooves | ±0.03 μm | ±0.03 μm |

The wobble signals reproduced from the optical disks ① and ② have the same signal level but the CNR of a magneto-optical signal recorded in the groove spaces 4 and having a mark length of 0.55 μm in the optical disk ② is improved by about 2 dB than the CNR in the optical disk ①.

Figure 18:
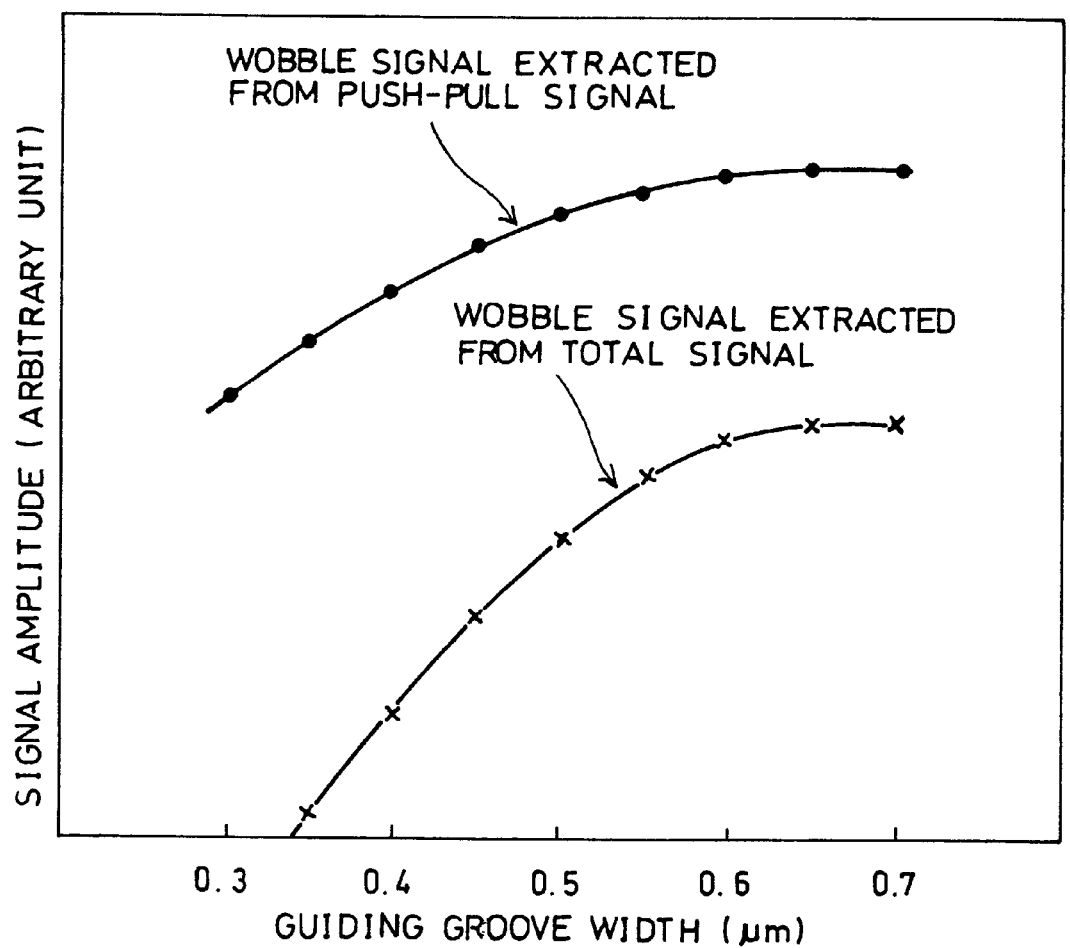
FIG. 18 is a graph showing a relation of a wobble signal amplitude versus a guiding groove width of the optical disk of FIG. 14.
Figure 19:
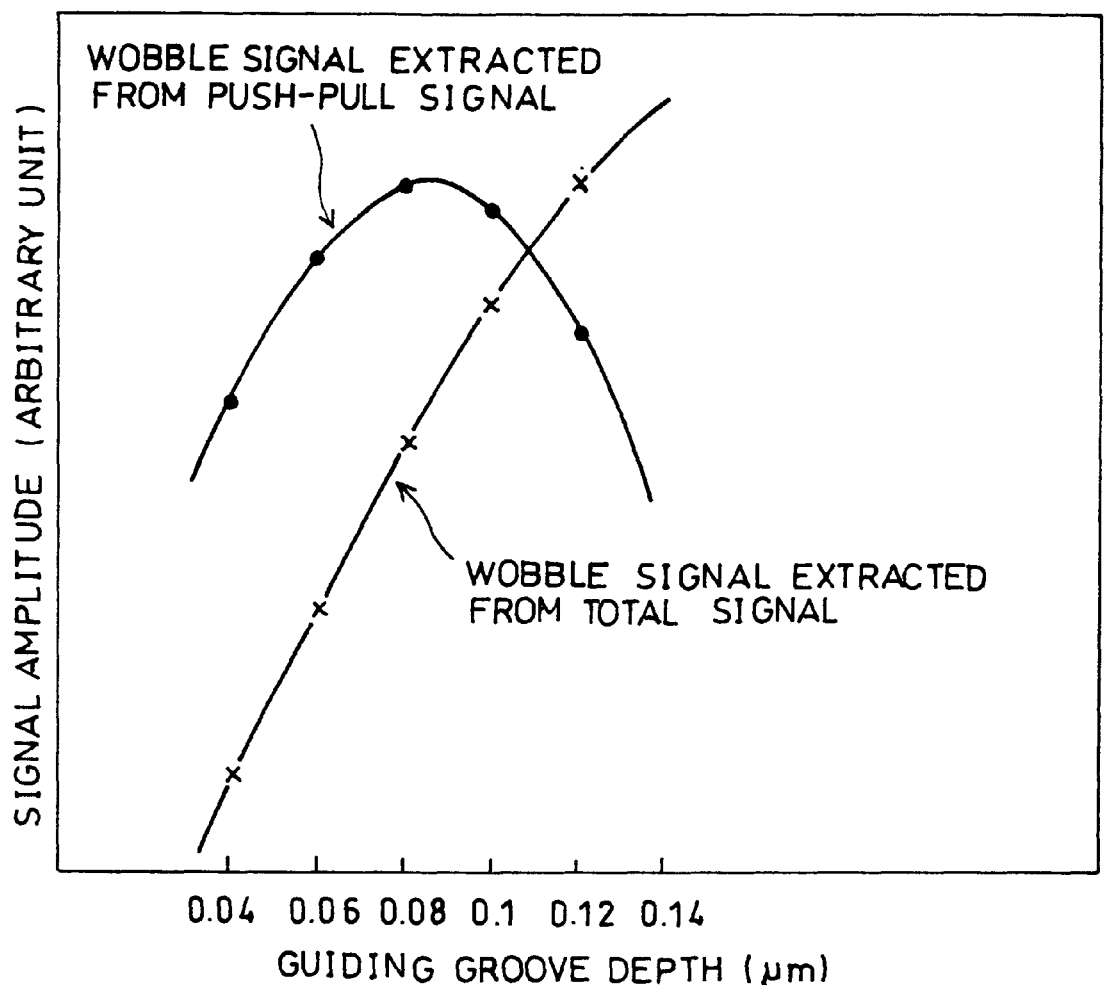
FIG. 19 is a graph showing a relation of a wobble signal amplitude versus a guiding groove depth of the optical disk of FIG. 14.

FIGS. 18 and 19 show a wobble signal extracted from a push-pull signal and a wobble signal extracted from a total signal reproduced from the optical disk having thereon the guiding grooves 3, composed of continuous grooves with a wobble amount of ±0.03 μm, using the above optical head. That is to say, FIG. 18 shows a graph explaining a relation of the wobble signal amplitude versus the guiding grooves width. Here, an optical depth of the guiding grooves is set to λ/8. FIG. 19 shows a graph explaining a relation of the wobble signal amplitude versus an optical depth of the guiding grooves. Here, an average width of the guiding grooves and track pitch are set to 0.7 μm and 1.4 μm, respectively.

FIGS. 18 and 19 reveal that to enable the wobble signal extracted from the total signal to attain at least half the maximum amplitude, the guiding grooves must be at least 0.5 μm wide. On the other hand, to enable the wobble signal extracted from the push-pull signal to attain at least half the maximum amplitude, the guiding groove must have an optical depth of at least 0.04 μm (=λ/17). Thus, the wobble signal extracted from the push-pull signal has a larger allowance for various shapes of the guiding grooves than the wobble signal extracted from the total signal.

(Embodiment 4)

The following description will describe still another example embodiment of the present invention. Hereinafter, like components are labeled with like reference numerals with respect to Embodiments above, and the description of these components is not repeated for the explanation's convenience.

Figure 20:
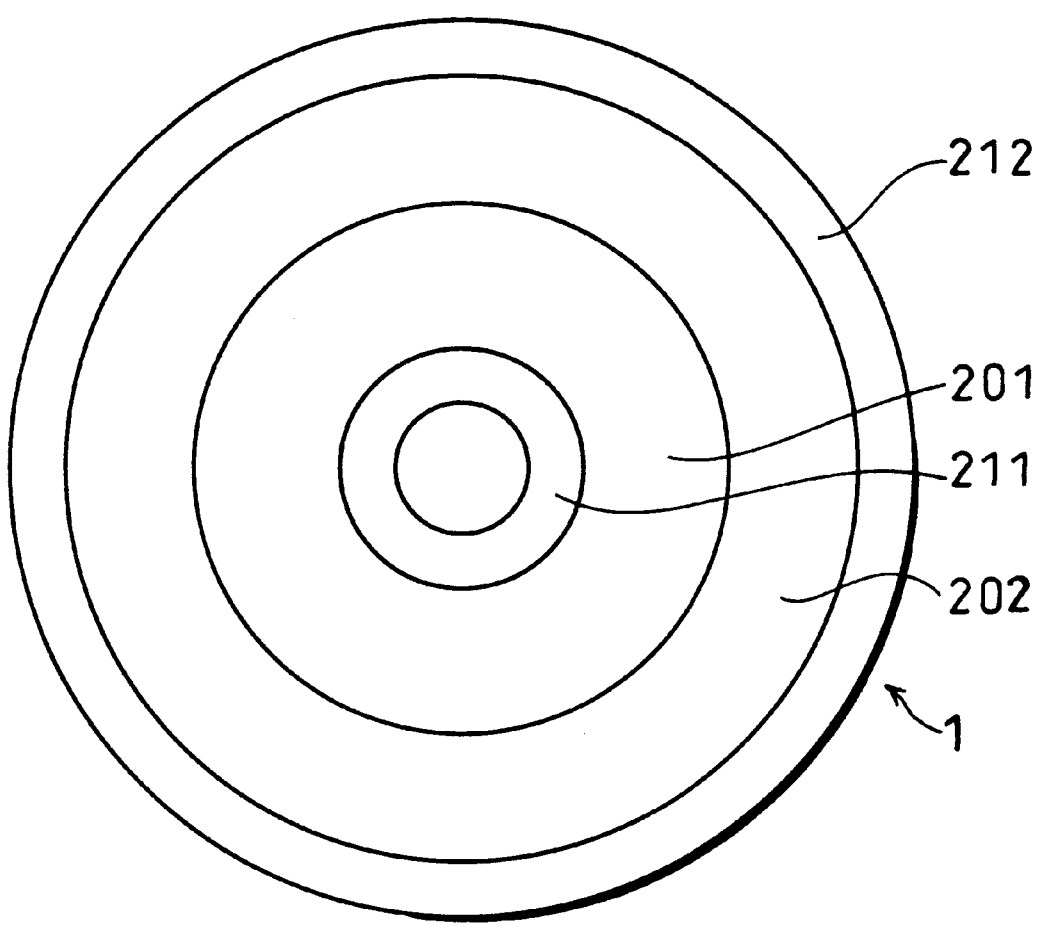
FIG. 20 is a plan view of an example arrangement of an optical disk of the present invention having a lead-in area and a lead-out area.

As shown in FIG. 20, the optical disk 1 of the present embodiment has a lead-in area 211 at the inner-most peripheral and a lead-out area 212 at the outer-most peripheral. In the lead-in area 211, data as to control information, such as address management information of the data reproduce-only area and recording/reproducing conditions in the data recording/reproducing area are recorded in the form of pits or wobbles. In the lead-out area 212, data indicating the end of the track are recorded in the form of pits or wobbles. The areas 211 and 212 may comprise guiding grooves composed of the pit array or guiding grooves composed of continuous grooves. In the latter case, particulars in the control information that need to be updated, for example, address management information of the data recordable area, can be recorded in the form of the magneto-optical signal or phase change signal.

An optical disk recording/reproducing apparatus reads out the above data and store the same into a memory at the start-up to use the same when recording a signal into or reproducing or erasing the signal from the optical disk 1 later.

The lead-in area 211 and lead-out area 212 can be formed in the same format as the data reproduce-only area 19 or data recordable area 20.

In the optical disks that start the recording/reproducing from the outer to inner direction, the lead-in area and lead-out area are made at the outer-most peripheral and the inner-most peripheral, respectively.

The lead-out area can be omitted when the lead-out information is unnecessary.

(Embodiment 5)

The following description will describe an example apparatus for manufacturing the optical disks of Embodiments 1–4 above with a mastering process of the optical disks.

To begin with, the mastering process of the optical disk will be explained with reference to FIGS. 2(a) through 2(f).

A photoresist (photomask) 12 is spread over either side of a glass substrate 11 (FIG. 2 (a)). Then, a laser beam is converged on the photoresist 12 through an objective lens 13 to sensitize the photoresist in a desired pattern (FIG. 2(b)). After unnecessary photoresist is removed by developing the photoresist 12, the desired pattern made out of a remaining photoresist 12a is left on the glass substrate 11 (FIG. 2(c)).

Next, a conductive thin film 14 is formed on the pattern made of the photoresist 12a through sputtering or electroless plating (FIG. 2(d)). The thin film 14 is made of Ni, Ta, Cr, or alloy of each of these three elements. Alternatively, the thin film 14 may be a mixture of films made of the above specified elements. Subsequently, a metal layer 15 is formed out of, for example, Ni, on the thin film 14 through electrocasting (FIG. 2(e)). The metal layer 15 is separated from the substrate 11, and as a result, a stamper 16 composed of the metal layer 15 and the thin film 14 layered on the metal layer 15 (FIG. 2(f)) is obtained.

An optical disk substrate 2 of a desired shape is made by molding plastic, such as polycarbonate, using the stamper 16. Then, the optical disk 1 is made by forming the recording film 6 and thence reflecting film 7 on the substrate 2 (see FIGS. 1(a) and 1(b)).

Figure 3:
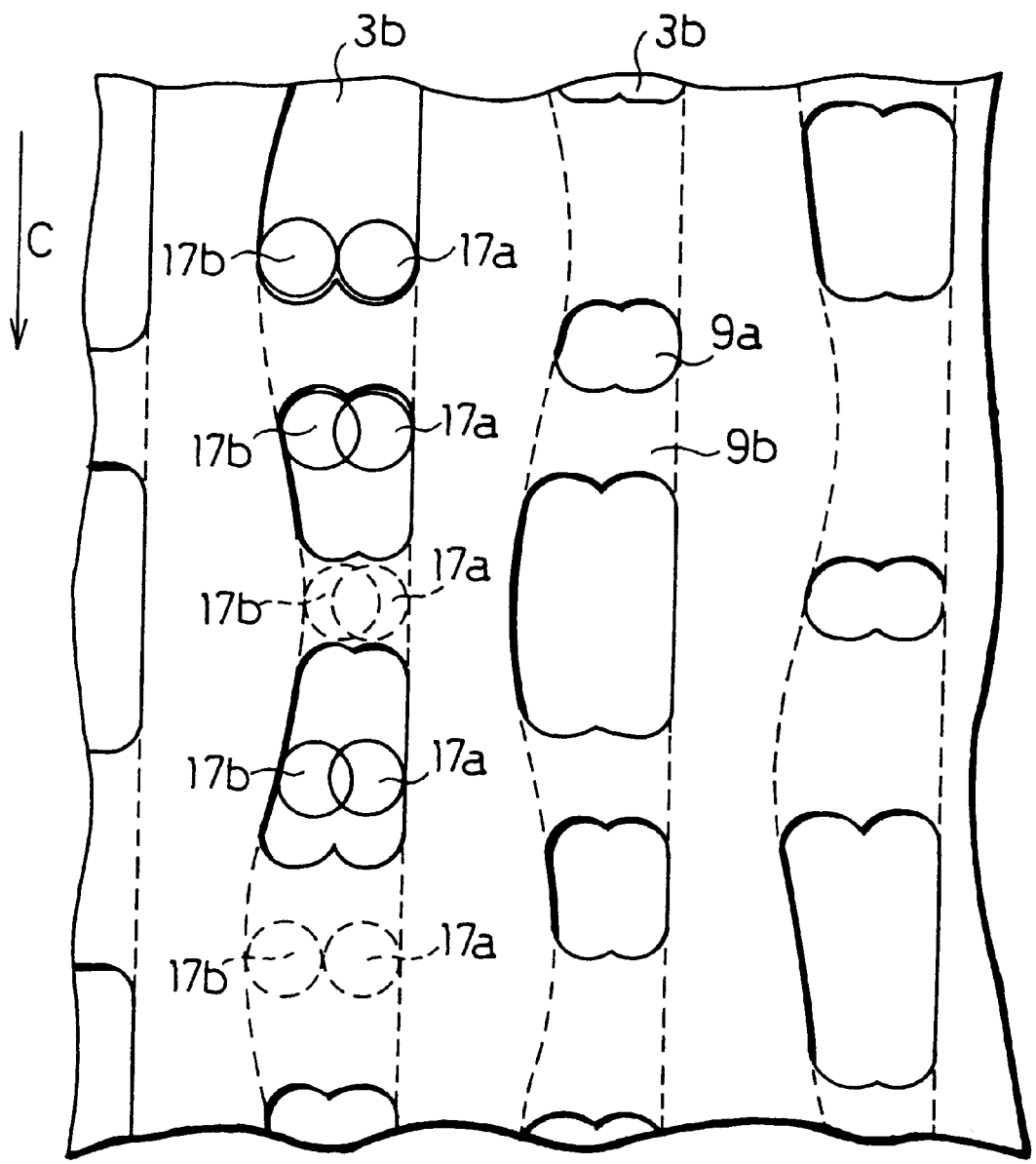
FIG. 3 is a plan view showing a relation between a guiding groove pattern made on a photoresist during the mastering process and two light spots.

A relation between two light spots 17a and 17b and guiding grooves 3 during the step of sensitizing the photoresist 12 is shown in FIG. 3. The light spots 17a and 17b move in the direction indicated by an arrow C as the disk rotates.

In case that the guiding grooves 3 are formed in spiral on the glass substrate 11, the light spots 17a and 17b are moved in spiral relatively with respect to the glass substrate 11. However, the light spot 17b is wobbled in a predetermined amplitude along the radius in accordance with the address information. Further, the light spots 17a and 17b are turned ON/OFF based on the data. In the drawing, a solid line indicates the ON state and a broken line indicates the OFF state. The photoresist 12 is sensitized where both the light spots 17a and 17b were turned ON, which is indicated by a solid line. On the other hand, the photoresist 12 is left intact where both the light spots 17a and 17b were turned OFF, which is indicated by a broken line. Thus, formed on the photoresist 12 as a result is a pattern of the pit array 3b of the guiding grooves 3, in which only the side wall 8a (see FIG. 1(b)) wobbles in accordance with the address information and the pits 9a are formed based on the data.

Figure 4:
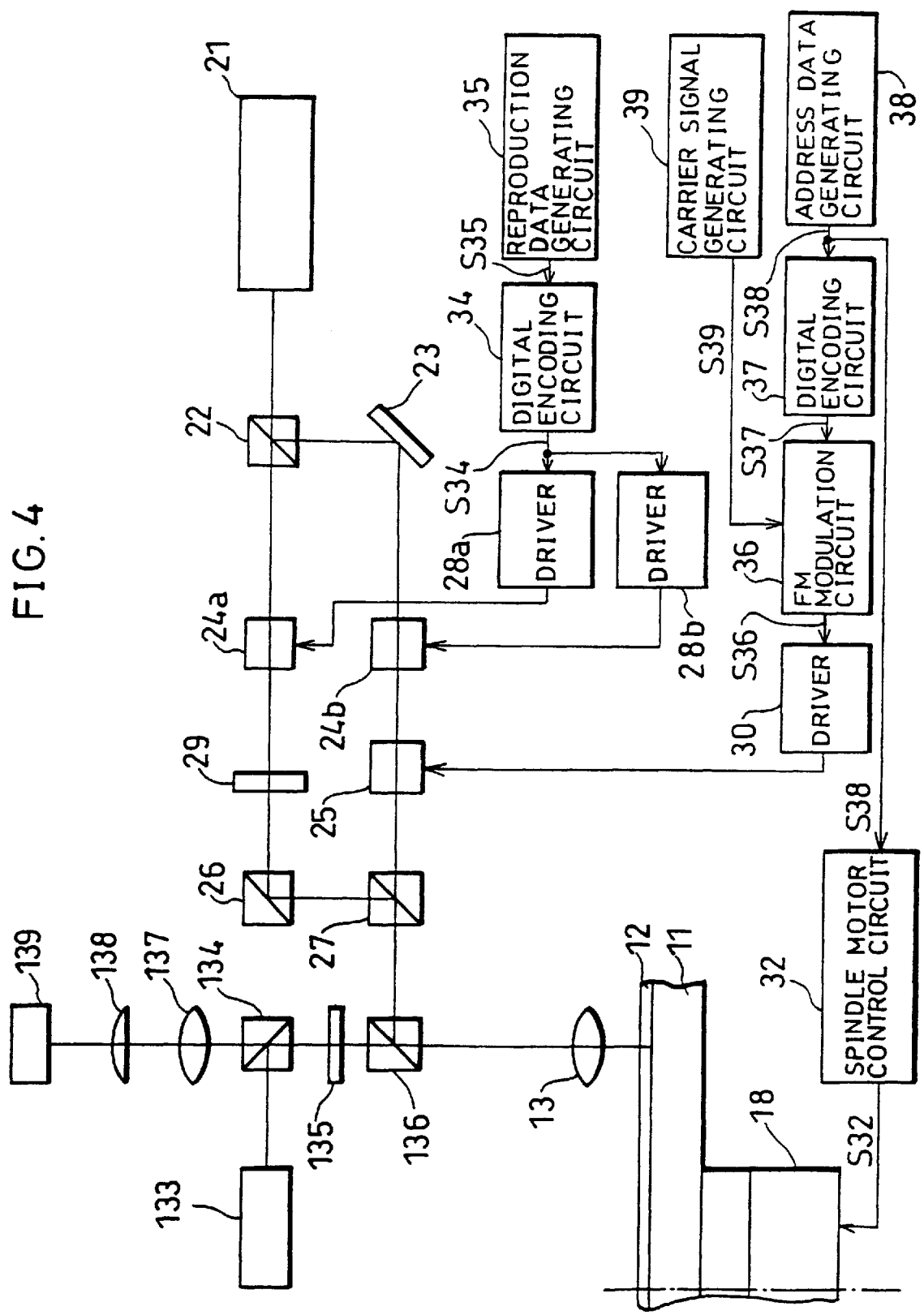
FIG. 4 is a block diagram showing an example embodiment of an optical disk manufacturing apparatus of the present invention.

FIG. 4 shows an optical disk manufacturing apparatus for manufacturing the stamper 16, which is used for manufacturing the substrate 2 of the optical disk 1 by sensitizing the photoresist 12.

The optical disk manufacturing apparatus includes a laser beam source 21 for sensitizing the photoresist 12, and a laser beam source 133 for controlling the focusing of the objective lens (converging means) 13. The laser beam source 21 is, for example, an argon laser having a wavelength of 458 nm or krypton laser having a wavelength of 407 nm. The laser beam source 133 is, for example, an He—Ne laser having a wavelength of 633 nm or semiconductor laser having a wavelength of 635 nm.

A laser beam emitted from the laser beam source 21 enters into a beam splitter 22 (light splitting means), and comes out as two split light beams, which enter into light modulators (light modulating means) 24a and 24b, respectively. The light modulators 24a and 24b are, for example, an acousto-optical element for changing deflecting directions of the light beam, or liquid crystal shutter for changing transmittance of the light beam.

The polarizing direction of the light beam coming out from the light modulator 24a is rotated 90° by a ½-wavelength plate 29 and reflected by a prism mirror 26. The other light beam coming out from the light modulator 24b goes into a light deflector 25 which is an element for changing a moving direction of a light beam using electro-optical effect or acousto-optical effect. Here, the laser beam source 21 and beam splitter 22 constitute irradiating means.

The two light beams are synthesized into one light beam by a polarizing prism 27, and the synthesized light beam is reflected by a dichroic prism 136 to the objective lens 13. Then, the synthesized light beam is converged on the photoresist 12 layered on the glass substrate 11 through the objective lens 13 to form the light spots 17a and 17b thereon.

Since a laser beam emitted from the laser beam source 21 is split herein as explained above, only one light source is provided. Therefore, the arrangement of the optical disk manufacturing apparatus can be simplified.

The ½-wavelength plate 29 is used to prevent the interference of the two light beams split at the beam splitter 22 when the same are synthesized by the polarizing prism 27. More specifically, the ½-wavelength plate 29 converts the light beams respectively into non-interfering polarized light components that intersect with each other. The ½-wavelength plate 29 can be omitted if the beam splitter 22 and polarizing prism 27 keep a distance longer than a coherence distance of the laser beam source 21. However, this is not practical because the apparatus is undesirably upsized.

The light modulators 24a and 24b are under the control of drivers 28a and 28b, respectively. The drivers 28a and 28b are connected to data input means (a digital encoding circuit 34 and a reproduction data generating circuit 35). Herein, the data input means and light modulating means constitute light amount adjusting means.

In the data input means, reproduction data S35 are supplied to the digital encoding circuit 34 from the reproduction data generating circuit 35 to be converted into a digital signal S34 through a predetermined modulation method (for example, EFM). The digital signal S34 is inputted into both the drivers 28a and 28b, so that the drivers 28a and 28b respectively control the light modulators 24a and 24b, for example to make the light spots 17a and 17b come ON when the digital signal 34 exhibits "1" and make the same go OFF when "0".

The light deflector 25 is controlled by a driver 30. The driver 30 is connected to address input means (an FM modulation circuit 36, a digital encoding circuit 37, an address data generating circuit 38, and a carrier signal generating circuit 39). Herein, the light deflector 25, driver 30, and address input means constitute wobbling means.

In the address input means, address data S38 are supplied to the digital encoding circuit 37 from the address data generating circuit 38 to be converted into a digital signal S37 through the bi-phase modulation. The digital signal S37 is inputted into the FM modulation circuit 36 together with a carrier signal S39 having a frequency of f supplied from the carrier signal generating circuit 39, and outputted as an FM signal S36. The FM signal S36 is inputted into a driver 30, so that the light spot 17b is wobbled along the radius. The address data S38 are also inputted into a spindle motor control circuit 32, which controls a spindle motor 18 to rotate the glass substrate 11 at a predetermined revolution corresponding to a radius position computed using the address data S38.

Besides the CLV (Constant Linear Velocity) system, ZCLV, CAV, ZCAV, etc. are applicable as a rotation control method of the spindle motor 18. These methods can be readily switched by replacing the spindle motor control circuit 32. In the present embodiment, the CLV system is adopted.

Next, an optical system for controlling the laser beam focusing will be explained.

A laser beam emitted from the laser beam source 133 passes through a polarization beam splitter 134, a ¼-wavelength plate 135, a dichroic prism 136 and is converged on the main surface of the glass substrate 11 by means of the objective lens 13. Reflected light from the glass substrate 11 passes through the objective lens 13, dichroic prism 136, ¼-wavelength plate 135, and polarization beam splitter 134, and is converged to a quadrant photodetector 139 through a spot lens 137 and a cylindrical lens 138. The quadrant photodetectors 139 generates a focus error signal using the astigmatic method. Then, the objective lens 13 is driven in the focusing direction by an unillustrated focus actuator, so that the focal point is always on the photoresist 12 layered on the glass substrate 11.

The step of exposing the photoresist 12 on the glass substrate 11 using the above arrangement will be explained.

Assume that, in the following explanation, the details of the pattern on the optical disk 1 are given as follow:
  track pitch: 1.44 μm
  average width of guiding grooves 3: 0.7 μm
  average width of groove spaces 4: 0.7 μm
  wobbling of the side wall 8a of the guiding grooves 3
    along the radius: ±0.03 μm Also, assume that the wavelength of the laser beam source 21 and an NA of the objective lens 13 are preset to make light spots 17a and 17b (see FIG. 3) having a diameter of 0.4 μm. To begin with, the driver 30 sets a DC voltage applied to the light deflector 25 and adjusts the position of the light spot 17b, so that the light spots 17a and 17b keep an average space of 0.3 μm along the radius. Then, the driver 30 adjusts an AC voltage applied to the light deflector 25, so that the spot 17b wobbles ±0.03 μm along the radius, and superimposes an AC voltage corresponding to the FM signal S36 outputted from the FM modulation circuit 36 of the address input means on the above DC voltage. Further, voltages are applied to the drivers 28a and 28b in response to the digital signal S34 outputted from the digital encoding circuit 34 of the data input means to make the light spots 17a and 17b come ON or go OFF in the data reproduce-only area. The glass substrate 11 and the light spots 17a and 17b are relatively positioned along the disk diameter in such a manner that the light spots 17a and 17b moves 1.4 µm (one track pitch) as the glass substrate rotates once. The spindle motor control circuit 32 controls the revolution of the spindle motor 18 under the CLV system in response to the position of the light spots 17a and 17b along the radius.

Mechanism for moving the relative position of the light spots 17a and 17b with respect to the glass substrate 11 along the radius, namely, radius moving mechanism, are realized by the following arrangements:

① the entire optical system including the objective lens 13 is fixed, while the spindle motor 18 is moved along the radius using an unillustrated linear motor;

② the spindle motor 18 is fixed, while the entire optical system including the objective lens 13 is moved along the radius using an unillustrated linear motor; and ③ the optical system is divided into a fixed portion and movable portion, and the focus controlling optical system—the laser beam source 133, polarization beam splitter 134, ¼-wavelength plate 135, dichroic prism 136, objective lens 13, spot lens 137, cylindrical lens 138, and quadrant photodetector 139—is made into the movable portion and moved along the radius using an unillustrated linear motor.

An amount of an overlapping portion of the light spots 17a and 17b is set to 0.1 µm, so that it is sufficiently large compared with the wobbling amount of ±0.03 µm. Accordingly, the photoresist 12 (see FIGS. 2(a) through 2(f)) is exposed completely without leaving any unexposed portion, and a clear guiding groove pattern is left thereon. The edge portions of the pit 9a pattern (see FIG. 3) is of a shape that the two circles (arcs) having a diameter of 0.4 µm overlap one on the other for 0.1 µm as previously mentioned because of the shapes of the light spots 17a and 17b.

The light spots 17a and 17b only have to keep a predetermined space in a direction that intersects at right angles with the track, or the light spots 17a and 17b may be shifted along the track. To be more specific, the light spots 17a and 17b may be on the same track, and an angle between the lines connecting the light spot 17a, the center of the disk, and light spot 17b in this order may be larger than 0. Note that, however, since the track has a curvature and is not a complete straight line, spacing apart the light spots 17a and 17b more than necessary is not preferable, because the guiding grooves in the inner portion having a small curvature becomes wider than the guiding grooves in the outer portion having a large curvature. Moreover, the ON/OFF timing of the drivers 28a and 28b must be controlled in response to the shifting of the light spots 17a and 17b along the track.

(Embodiment 6)

Figure 5:
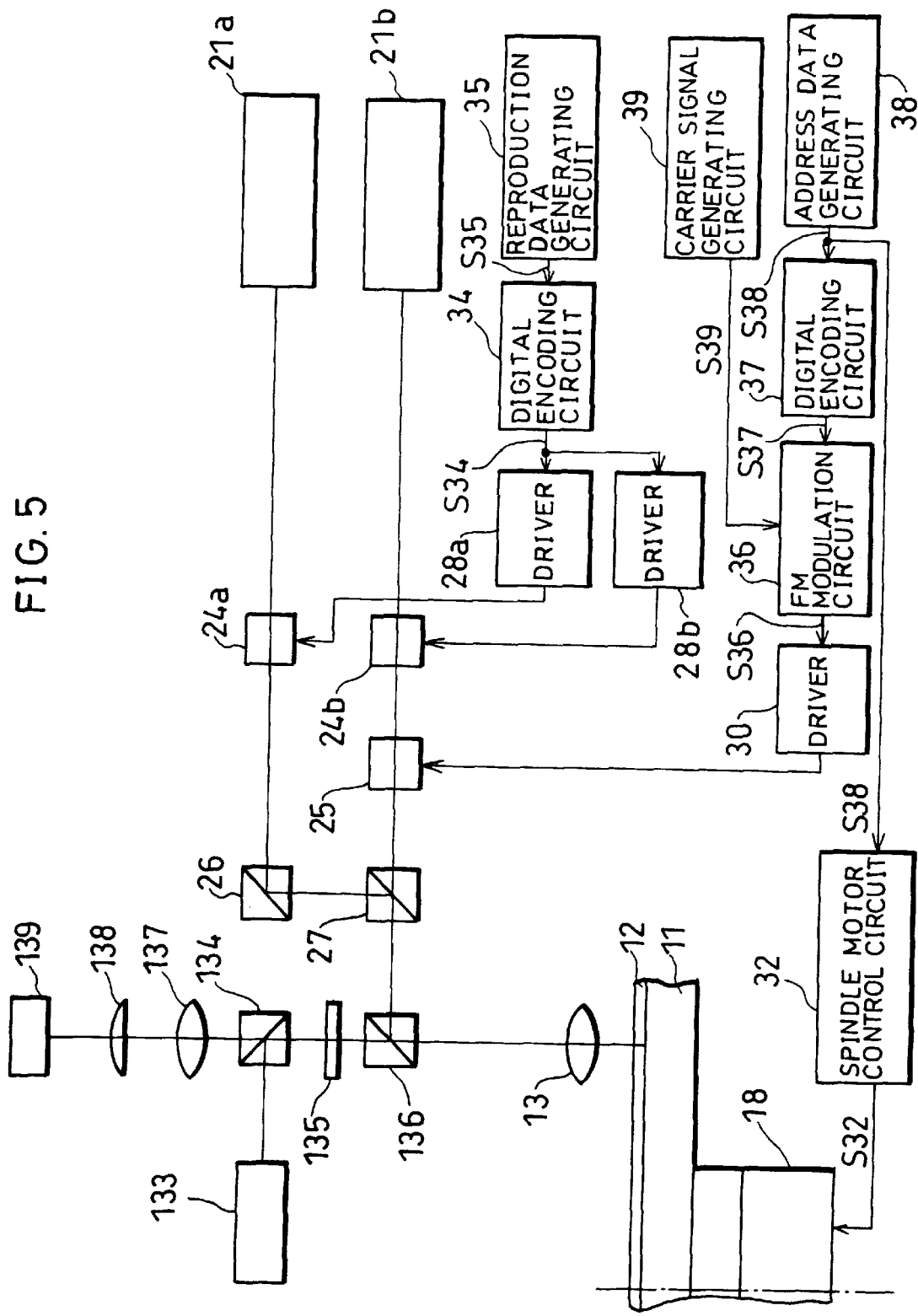
FIG. 5 is a block diagram showing another example embodiment of an optical disk manufacturing apparatus of the present invention.
Figure 6:
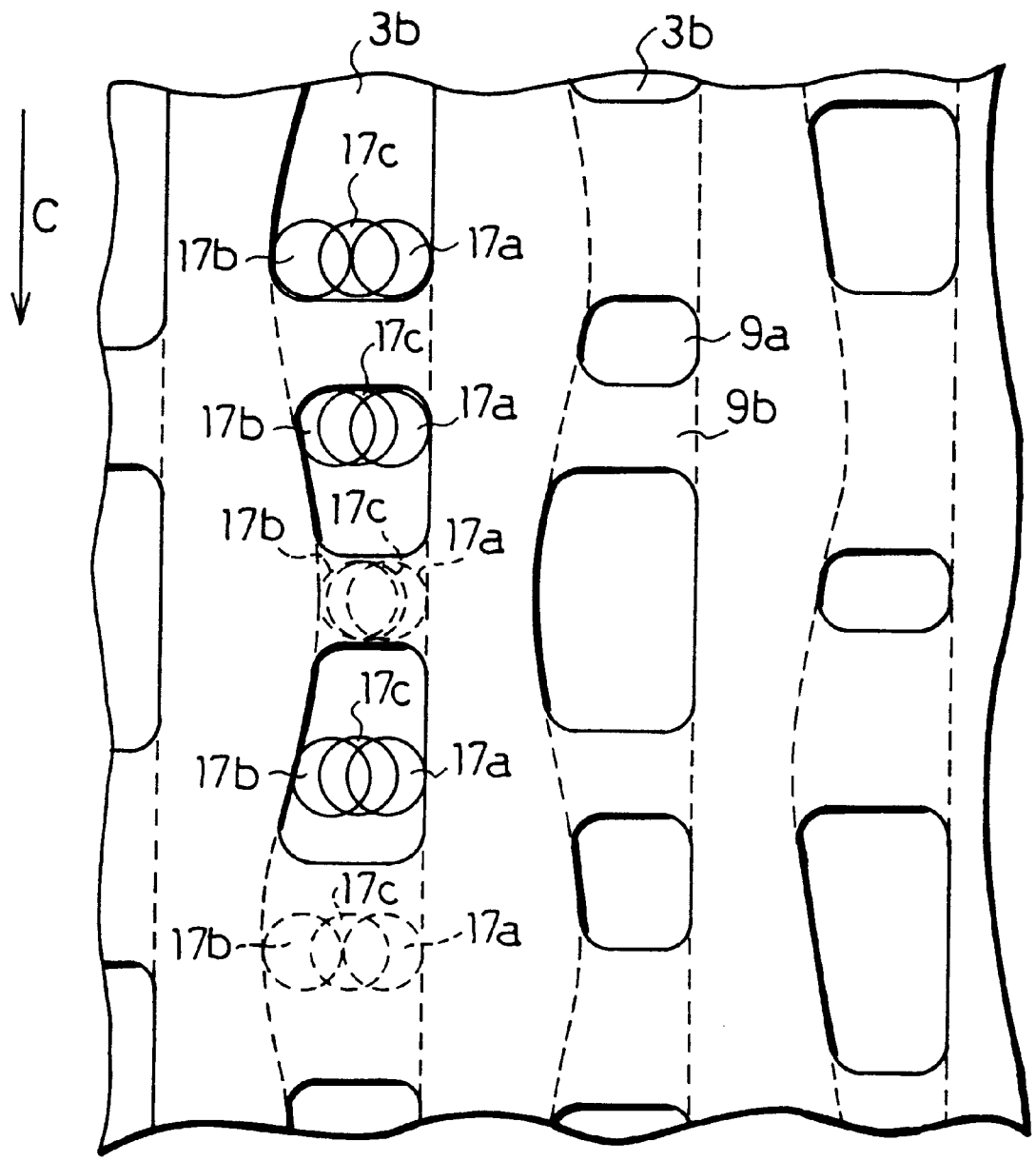
FIG. 6 is a plan view showing a relation between a guiding groove pattern made on a photoresist during the mastering process and three light spots.

The following description will describe another example apparatus for manufacturing the optical disks of Embodiments 1–4 above with reference to FIGS. 5 and 6.

An optical disk manufacturing apparatus of the present invention is identical with the counterpart of Embodiment 5 except that two recording laser beam sources 21a and 21b (first and second light sources) are provided as the recording light source and that the ½-wavelength plate 29 is omitted.

The ½-wavelength plate 29 for converting the two laser beams into non-interfering polarized light beams that intersect at right angles with each other is indispensable in Embodiment 5, but omitted herein. This is because two laser beams emitted from their respective laser beam sources 21a and 21b do not interfere with each other even when they are imposed one on the other by the optical system within the apparatus.

According to the arrangement in Embodiment 5, only two non-interfering laser beams that intersect with each other can be synthesized. However, according to the arrangement in the present embodiment, more than two laser beams can be synthesized. Since one laser beam source only has to emit a single light beam, a light output from each laser beam source can be reduced, thereby extending the lifetime of each laser beam source.

Further, the arrangements in Embodiments 5 and 6 can be combined. For example, when three laser need to be synthesized, only two laser beam sources are used. To be more specific, a light beam emitted from either laser beam source is split into two light beams using the light splitting means.

FIG. 6 shows a relation between the light spots 17a, 17b, and 17c and the guiding grooves 3 during the step of sensitizing the photoresist 12 using three laser beams. In this case, the diameter of each of the light spot 17a, 17b, and 17c is about half the pit width, and the recess at the center of the edge portion of the pit 9a pattern is eliminated by the light spot 17c. Consequently, the resulting pit 9a pattern further approximates to a rectangle.

The roundness of the edge portion of the pit 9a pattern can be reduced to further approximate the resulting pit 9a to a rectangle if the diameter of each of the light spot 17a, 17b, and 17c is reduced to about one thirds of the pit width.

The light spot 17c and 17a are fixed to keep a predetermined space in FIG. 6, but the light spot 17c may wobble together with the light spot 17b in a direction intersecting at right angles with the track.

(Embodiment 7)

Figure 7:
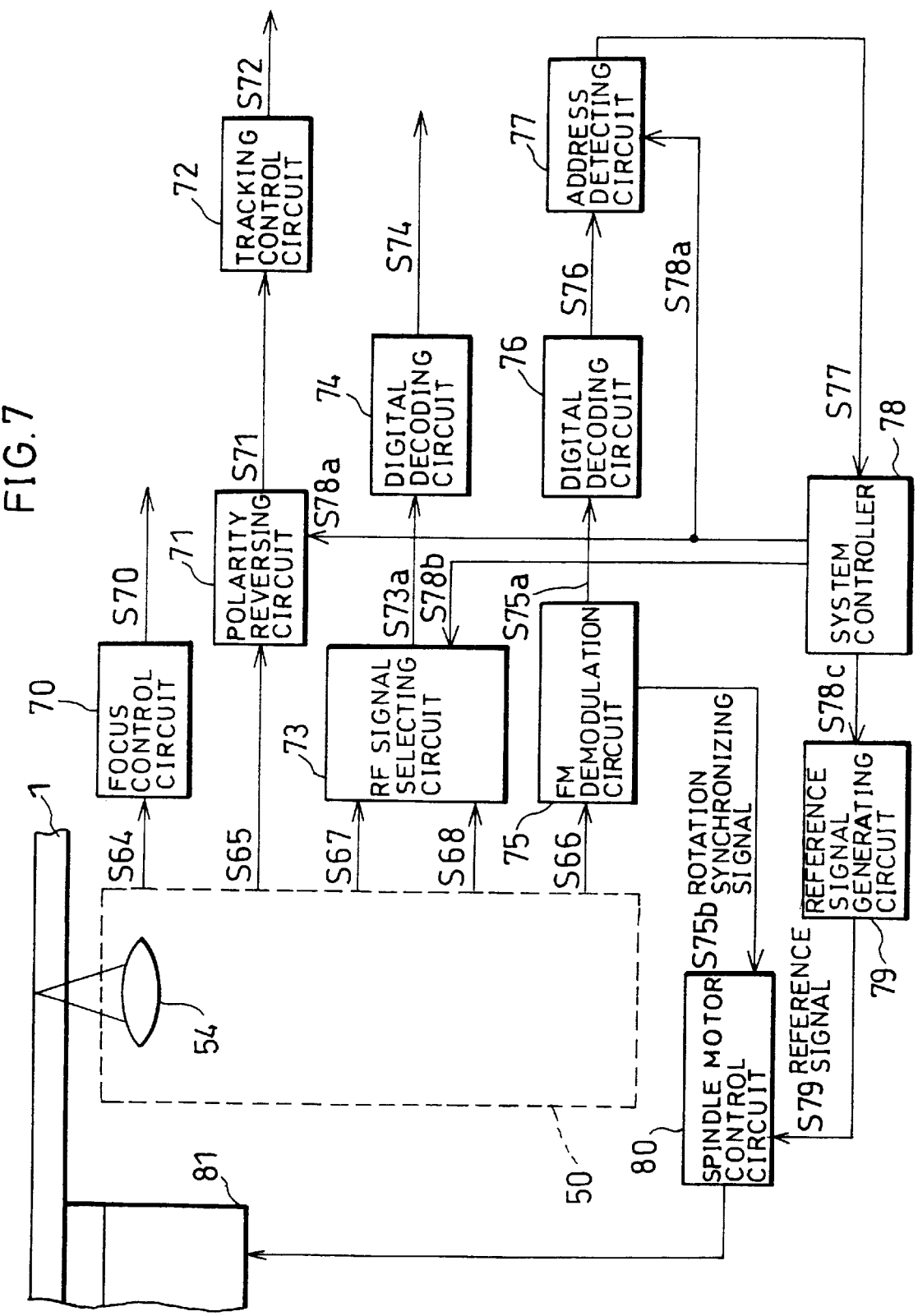
FIG. 7 is a block diagram showing an example optical disk recording/reproducing apparatus of the present invention.

FIG. 7 is a block diagram of an optical disk recording/reproducing apparatus of the present embodiment. The present optical disk recording/reproducing apparatus includes the optical disk 1, optical head (recording means) 50, a focus control circuit 70, a polarity reversing circuit 71, a tracking control circuit 72, a data reproducing means (an RF signal selecting circuit 73, a digital decoding circuit 74), wobble signal detecting means (an FM demodulation circuit 75, a digital decoding circuit 76, and an address detecting circuit 77), a system controller (signal selecting means, reference signal switching means) 78, a reference signal generating circuit (reference signal generating means) 79, a spindle motor control circuit (rotation control means) 80, and a spindle motor (a motor) 81. Although it is not illustrated in the drawing, the apparatus also includes components necessary for data recording, such as circuitry and an magnetic head.

Next, an operation of the above-arranged optical disk recording/reproducing apparatus will be explained in the following.

The optical head 50 forms a converged light spot on the optical disk 1 to produce a focus error signal S64, a tracking error signal S65, a wobble signal S66, a pit signal S67, and a recording/reproducing signal (magneto-optical signal or phase change signal) S68 out of the reflected light from the optical disk 1. A detailed explanation of the optical head 50 will be given below.

The focus error signal S64 is inputted into the focus control circuit 70 to drive the objective lens 54 by means of an unillustrated focus actuator to bring a light beam to the focal point.

The tracking error signal S65 is inputted into the tracking control circuit 72 through the polarity reversing circuit 71 to drive the objective lens 54 by means of an unillustrated tracking actuator to make a light beam follow along a specific track. The polarity reversing circuit 71 decides whether the polarity of an output signal S71 should be reversed or not based on a control signal S78a indicating the tracking polarity inputted from the system controller 78, and whether the light beam should follow the guiding grooves 3 or groove spaces 4 on the optical disk 1. Since the data reproduce-only area 19 and data recordable area 20 alternate on the optical disk 1, access between these two areas can be accelerated.

The wobble signal S66 is converted into a bi-phase digital signal S75a by the FM demodulation circuit 75 using the FM signal, and a rotation synchronizing signal S75b having a frequency fa is extracted from the carrier signal of the FM signal. The digital signal S75a is further converted into address data S76 by the digital decoding circuit 76. An address indicated by the address data S76 is the same in the guiding groove 3 and groove space 4 sharing the wobbling side wall 8a on the optical disk 1. Thus, different logical addresses (address signals) S77 are allocated by the address detecting circuit 77 based on the control signal S78a indicating the tracking polarity inputted from the system controller 78. The address signal S77 is inputted into the system controller 78 to control the positions of the light spots on the optical disk 1.

The rotation synchronizing signal S75b, and a reference signal S79 having a frequency of fb supplied from the reference signal generating circuit 79 are inputted into the spindle motor control circuit 80. The frequency fa of the rotation synchronizing signal S75b and the frequency fb of the reference signal S79 are compared to always maintain a relation, fa=fb, in the following manner: that is, when fa>fb, the spindle motor 81 is slowed down, and when fa<fb, the spindle motor 81 is accelerated. This makes it possible to rotate the spindle motor 81 at a predetermined revolution in response to the reference signal.

The frequency fb of the reference signal S79 is switched based on the control signal S78c indicating the kind of the data area inputted from the system controller 78. For example, let the frequency for the data reproduce-only area 19 be fb1 and the frequency for the data recordable area 20 be fb2, then making fb1 to a half of fb2 can reduce the revolution of the optical disk and hence reduce the linear velocity to half. Here, given a constant reference frequency to the recording signal, then the linear recording density is in an inverse proportion to the revolution. Thus, reducing the linear velocity to half can double the linear recording density. Also, the reproducing circuit can be shared by controlling the revolution depending on the kind of the data area to maintain a constant reference frequency (reproduction reference frequency) of the reproduction signal.

Besides the CLV system, the rotation of the spindle motor 81 can be controlled by ZCLV, CAV (Constant Angle Velocity), ZCAV, etc. Although the CLV system can attain the largest recording capacity, the revolution is changed depending on the radius position. Thus, it takes a long time to control the revolution of the optical disk 1 at the time of access, thereby slowing down an overall accessing action. The CAV system can attain the shortest access time. In this system, the revolution of the optical disk 1 does not have to be changed, and the access time depends on the moving time of the optical head 50 alone. However, since the linear velocity becomes higher and the linear recording density is reduced in the outer peripheral, this system has a disadvantage that the disk has a small recording capacity. To compensate the disadvantages of the CLV and CAV systems, the ZCLV and ZCAV systems are proposed, in which the optical disk 1 is divided into a plurality of zones along the radius to set different revolutions or recording/reproducing frequency in each zone.

The RF signal selecting circuit 73 selects either the pit signal S67 or recording/reproducing signal (magneto-optical signal or phase change signal) S68 based on a control signal 78b indicating the kind of the data area inputted from the system controller 78, and inputs the selected signal into the digital decoding circuit 74 as a signal S73a.

Although the amplitude of the pit signal S67 and the amplitude of the recording/reproducing signal S68 may not match due to the difference in signal form, this problem can be eliminated by providing a signal amplitude adjusting amplifier before the RF signal selecting circuit 73.

The spindle motor control circuit 80 controls the rotation of the spindle motor 81, while at the same time the RF signal selecting circuit 73 selects the reproduction signal depending on the kind of the data area. Thus, the selected signal maintains a constant decoding reference frequency. This enables the data conversion using a common digital decoding circuit 74.

Next, the arrangement of the optical head 50 will be explained in detail.

Figure 8:
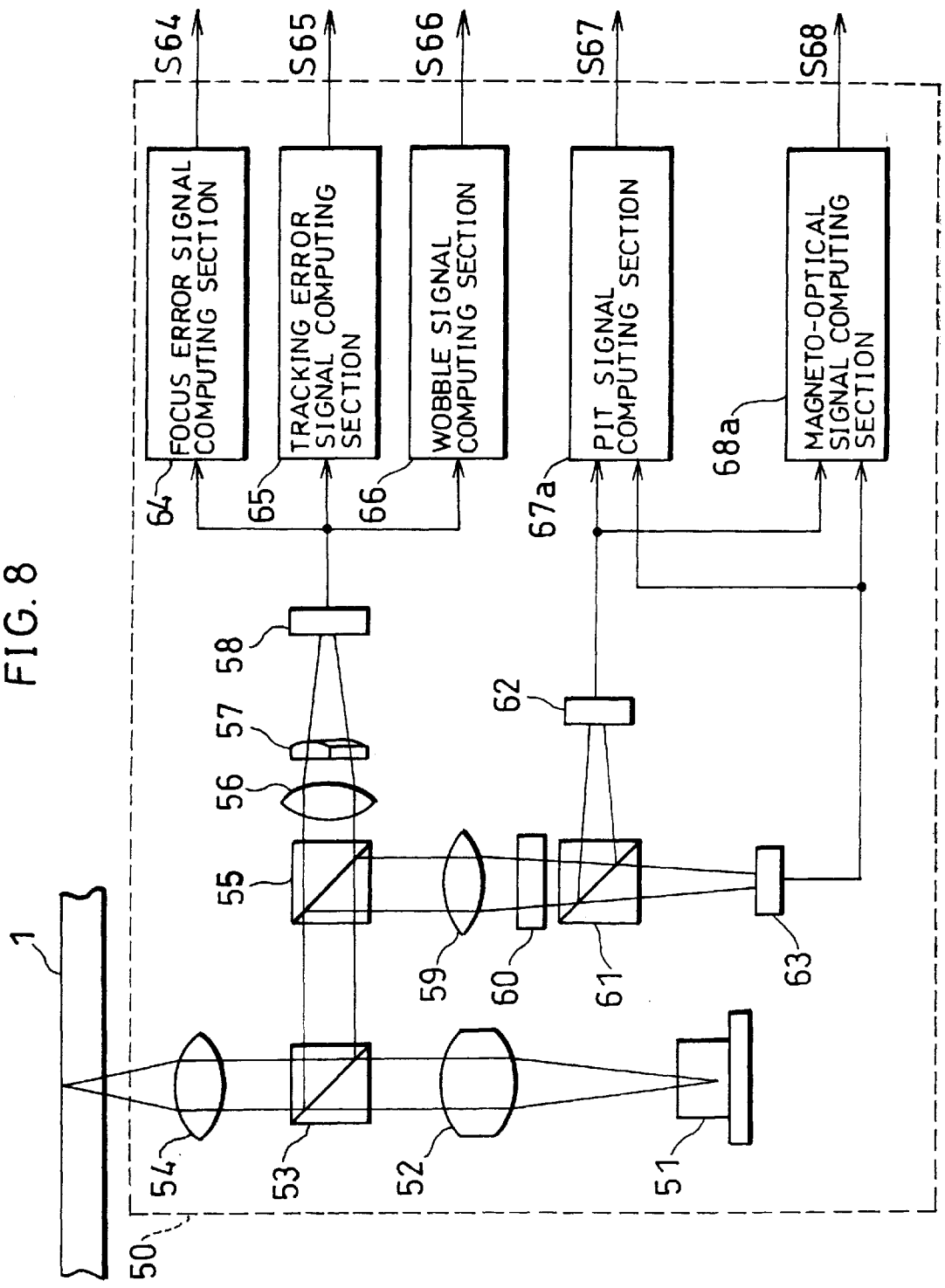
FIG. 8 is a block diagram showing an arrangement of an example optical head used in the optical disk recording/reproducing apparatus of FIG. 7.

(1) FIG. 8 shows the optical head 50 for recording/reproducing a magneto-optical signal into/from the data recordable area. Light emitted from the semiconductor laser 51 is converted into a parallel beam of light by a collimator lens 52, which passes through a first beam splitter 53 and is converged on the optical disk 1 by means of the objective lens 54. The reflected light from the optical disk 1 returns to the semiconductor laser 51 via the same optical path, while a part of the same is reflected by the first beam splitter 53.

The reflected light from the first beam splitter 53 is split into transmitting light and reflecting light by a second beam splitter 55. The transmitting light passes through the second beam splitter 55 and is converged onto the photodetector 58 through the spot lens 56 and cylindrical lens 57. The focus error signal S64, tracking error signal S65, and wobble signal S66 are generated out of the output from the photodetector 58 by a focus error signal computing section 64, a tracking error signal computing section 65, and a wobble signal computing section 66, respectively.

On the other hand, the reflected light from the second beam splitter 55 is converged by another spot lens 59. The polarizing orientation of this reflected light is rotated 45° by a ½-wavelength plate 60, and the polarized light is split into two light beams by a polarization beam splitter 61. The two split light beams go into the photodetector 62 and 63, respectively. The pit signal S67 and magneto-optical signal S68 are produced out of the outputs from the photodetectors 62 and 63 by a pit signal computing section 67a and a magneto-optical signal computing section 68a, respectively.

Figure 9:
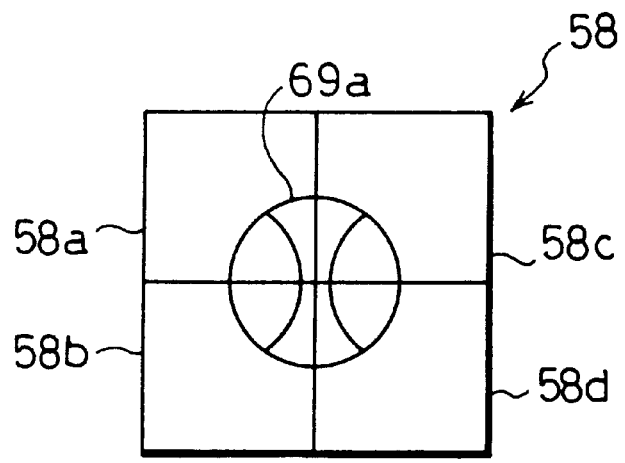
FIG. 9 is a plan view showing a shape of a photodetector used in the optical head of FIG. 8.
Figure 10:
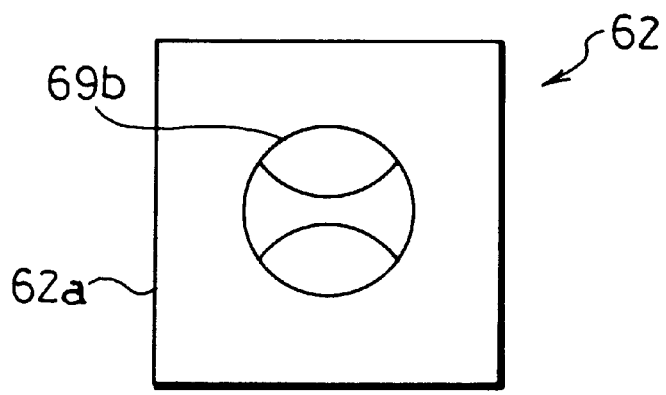
FIG. 10 is a plan view showing another shape of the photodetector used in the optical head of FIG. 8.
Figure 11:
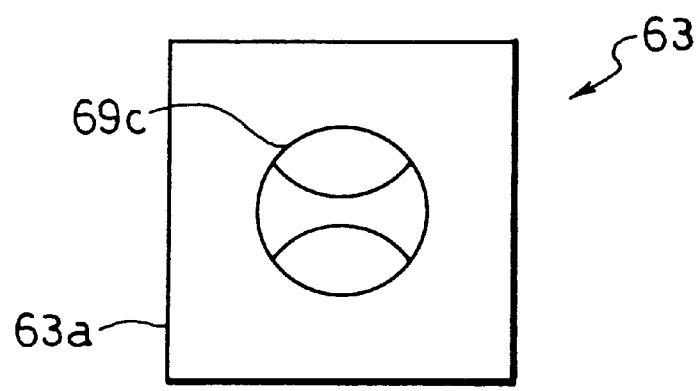
FIG. 11 is a plan view showing still another shape of the photodetector used in the optical head of FIG. 8.

FIGS. 9 through 11 illustrate a shape of each light receiving section of the photodetectors 58, 62, and 63 in the optical head 50. As shown in FIG. 9, the photodetector 58 is composed of four light receiving sections 58a–58d, at which a converged light spot 69a is received. As shown in FIG. 10, a light receiving section 62a of the photodetector 62 receives a converged light spot 69b, and as shown in FIG. 11, a light receiving section 63a of the photodetector 63 receives a converged light spot 69c.

Let an amount of received light at the light receiving sections 58a–58d, 62a, and 63a be S58a–S58d, S62, and S63, respectively, then a focus error signal (FES) is computed using the astigmatic method as follows:

FES=(S58a+SS8d)−(S58b+S58c).

A tracking error signal (TES) is computed using the push-pull method as follows:

TES=(S58a+S58b)−(S58c+S58d).

A wobble signal (WS) is computed in the same manner as the tracking error signal, that is:

WS=(S58a+S58b)−(S58c+S58d).

A pit signal (RF1) reproduced from the data reproduce-only area is computed as follows:

RF1=(S62+S63).

A magneto-optical signal (RF2) reproduced from the data recordable area is computed as follows:

RF2=(S62−S63).

Figure 12:
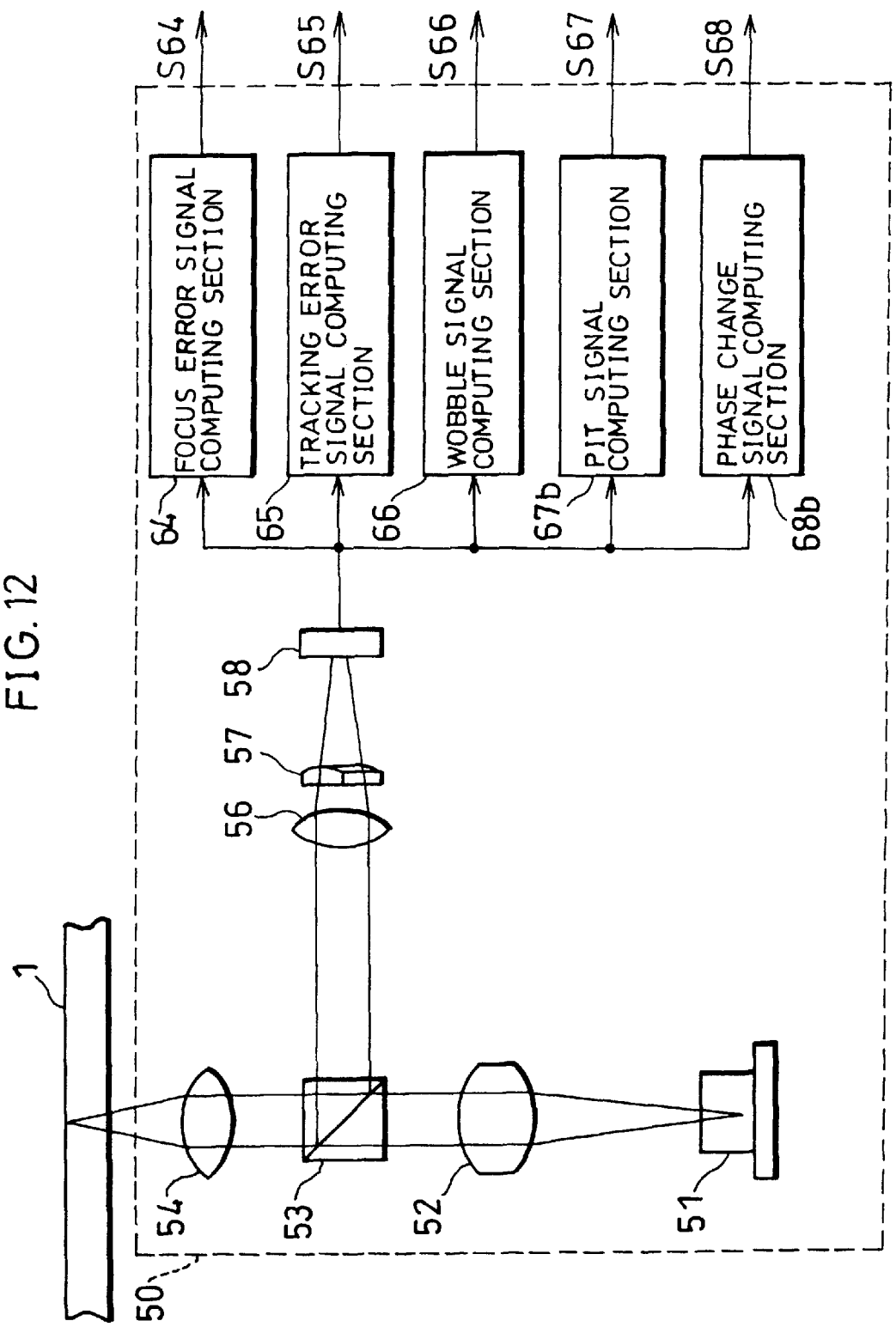
FIG. 12 is a block diagram showing an arrangement of another example optical head used in the optical disk recording/reproducing apparatus of FIG. 7.

(2) FIG. 12 shows an arrangement of the optical head 50 for recording/reproducing a phase change signal into/from the data recordable area. A laser beam emitted from the semiconductor laser 51 is converted into a parallel beam of light by a collimator lens 52, which passes through a first beam splitter 53 and is converged on the optical disk 1 by means of the objective lens 54. The reflected light from the optical disk 1 returns to the semiconductor laser 51 via the same optical path, while a part of the same is reflected by the first beam splitter 53. The reflected light from the first beam splitter 53 is converged onto the photodetector 58 through the spot lens 56 and cylindrical lens 57. The focus error signal S64, tracking error signal S65, wobble signal S66, pit signal S67, and phase change signal S68 are generated out of the output from the photodetector 58 by the focus error signal computing section 64, tracking error signal computing section 65, and wobble signal computing section 66, a pit signal computing section 67b, and a phase change signal computing section 68b, respectively.

Figure 13:
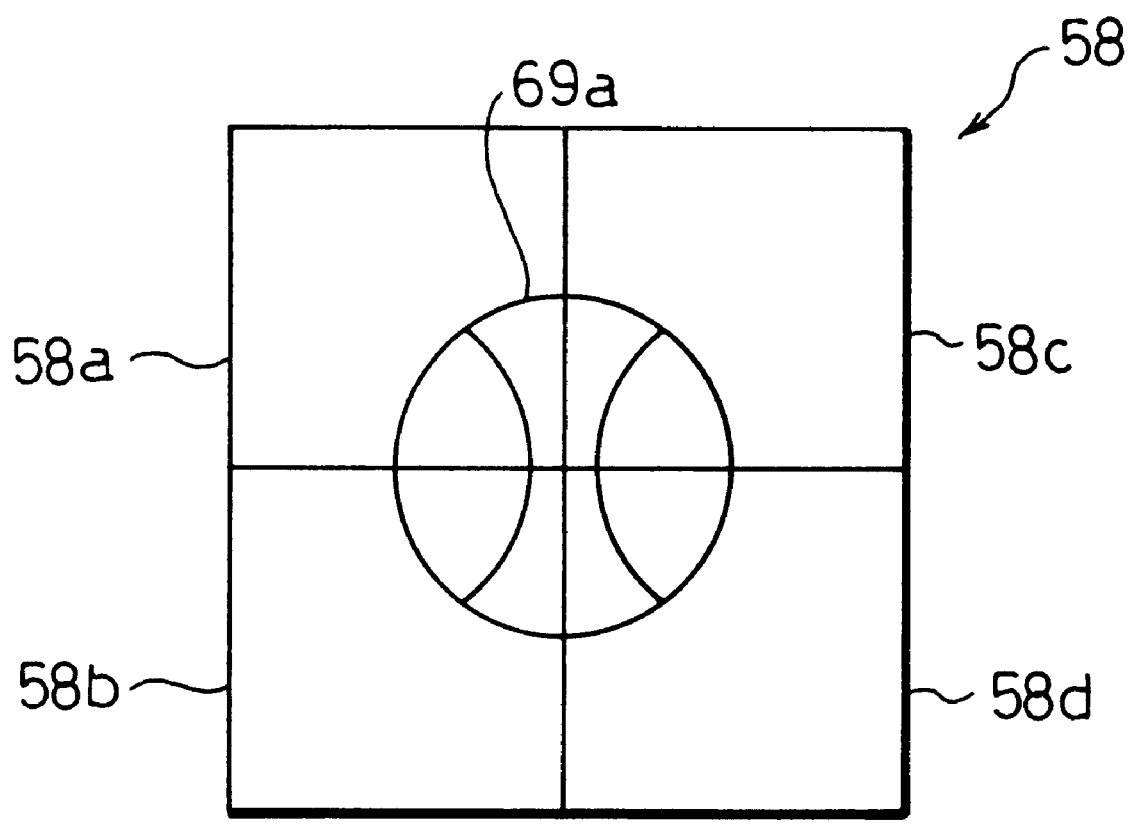
FIG. 13 is a plan view showing a shape of a photodetector used in the optical head of FIG. 12.

FIG. 13 illustrates a shape of the light receiving section of the photodetector 58. The photodetector 58 is composed of four light receiving sections 58a–58d, at which a converged light spot 69a is received.

Let an amount of received light at the light receiving sections 58a–58d be S58a–S58d, respectively, then a focus error signal (FES) is computed using the astigmatic method as follows:

FES=(S58a+S58d)−(S58b+S58c).

A tracking error signal (TES) is computed using the push-pull method as follows:

TES=(S58a+S58b)−(S58c+S58d).

A wobble signal (WS) is computed in the same manner as the tracking error signal, that is:

WS=(S58a+S58b)−(S58c+S58d).

A pit signal (RF1) reproduced from the data reproduce-only area is computed as follows:

RF1=(58a+58b+58c+58d).

A phase change signal (RF2) reproduced from the data recordable area is computed as follows:

RF2=(58a+58b+58c+58d).

The optical head 50 can be modified in several ways. For example, the reflected light from the optical disk 1 returning to the semiconductor laser 51 through the first beam splitter 53 as shown in FIG. 8 may be directed to an unillustrated photodetector installed into a laser package by an unillustrated hologram fixed on the upper surface of a cap of the semiconductor laser 51, so that the focus error signal, tracking error signal, and wobble signal may be detected by the unillustrated photodetector. Alternatively, either the photodetector 62 of FIG. 10 or photodetector 63 of FIG. 11 may be divided into two, so that the wobble signal may be detected from the converged light spots 69b and 69c.

Although low-pass filters or high-pass filters are omitted in FIGS. 8 and 12, they are provided in the focus error signal computing section 64, tracking error signal computing section 65, wobble signal computing section 66, pit signal computing sections 67a and 67b, magneto-optical signal computing section 68a, and phase change signal computing section 68b to extract necessary signals.

(Embodiment 8)

Figure 21:
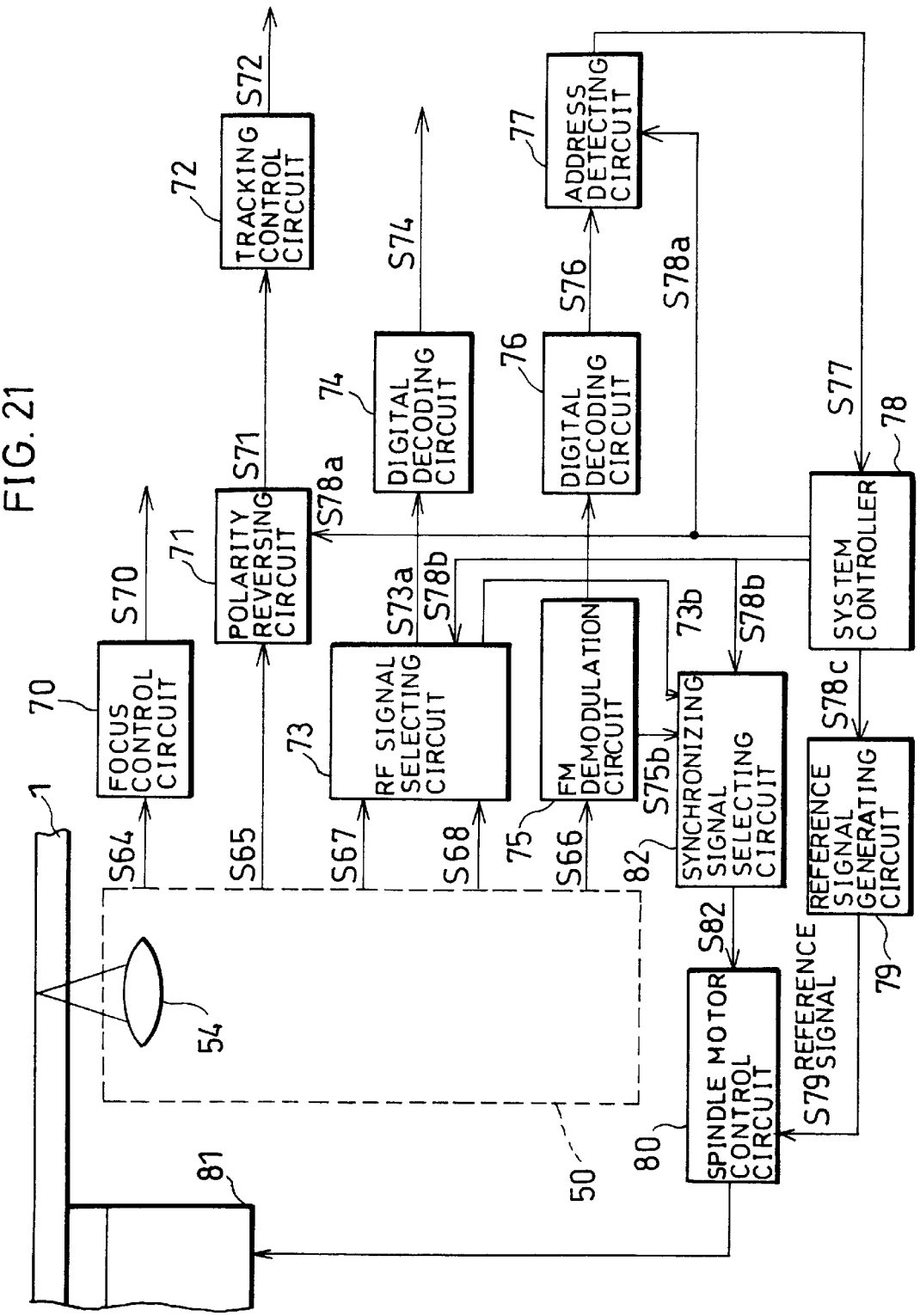
FIG. 21 is a block diagram showing an arrangement of another example optical disk recording/reproducing apparatus of the present invention.
Figure 22:
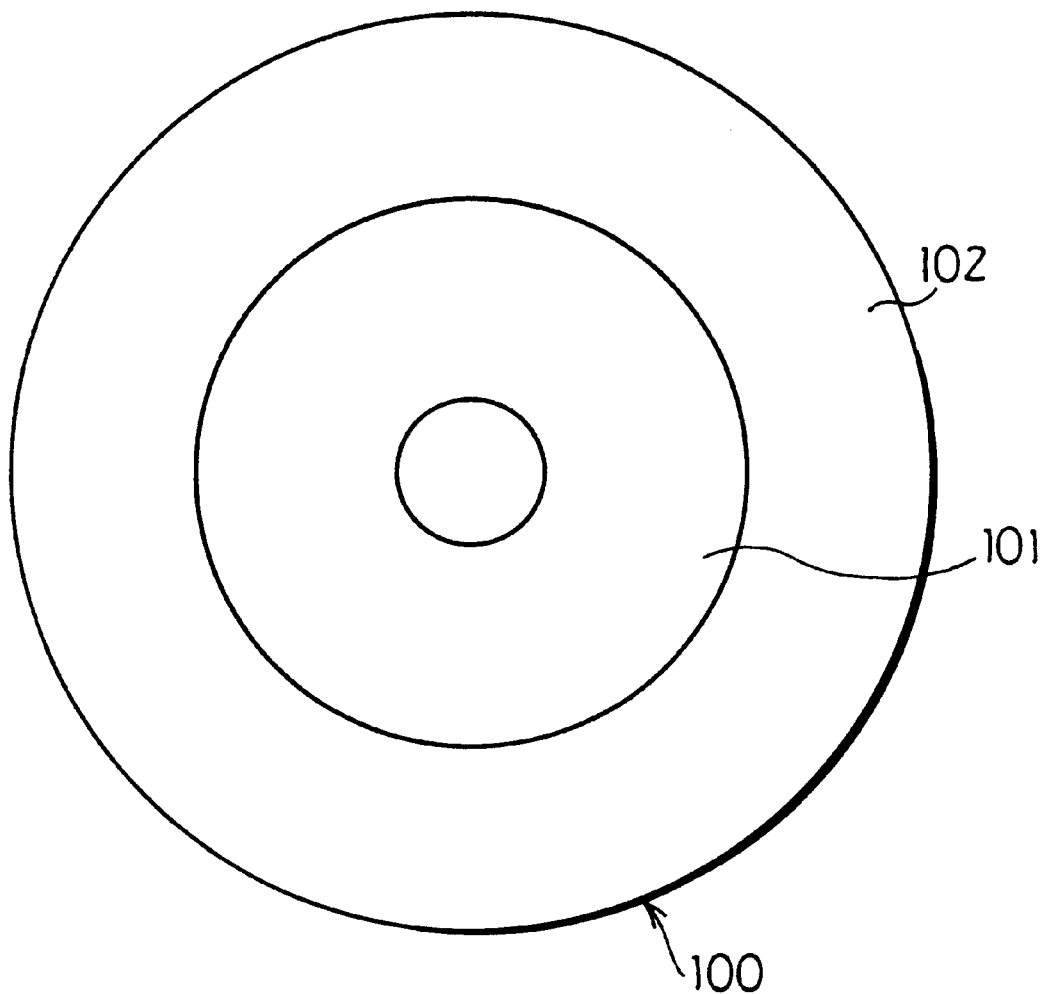
FIG. 22 is a plan view of a conventional optical disk having both a data reproduce-only area and a data recordable area.
Figure 24:
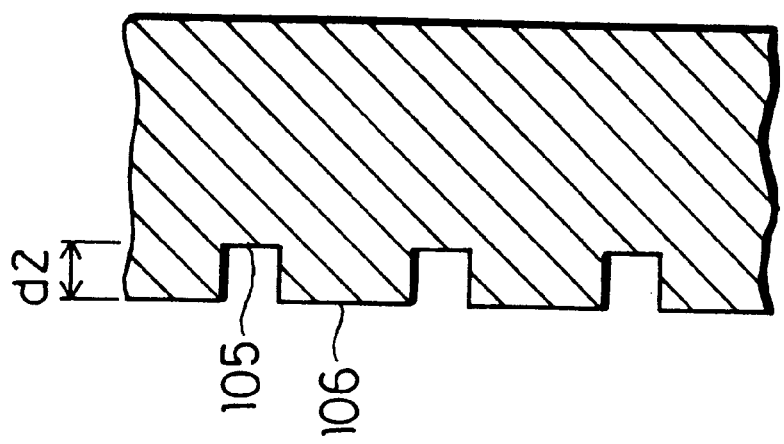
FIGS. 24(a) and 24(b) show the data recordable area of the conventional optical disk.
Figure 24:
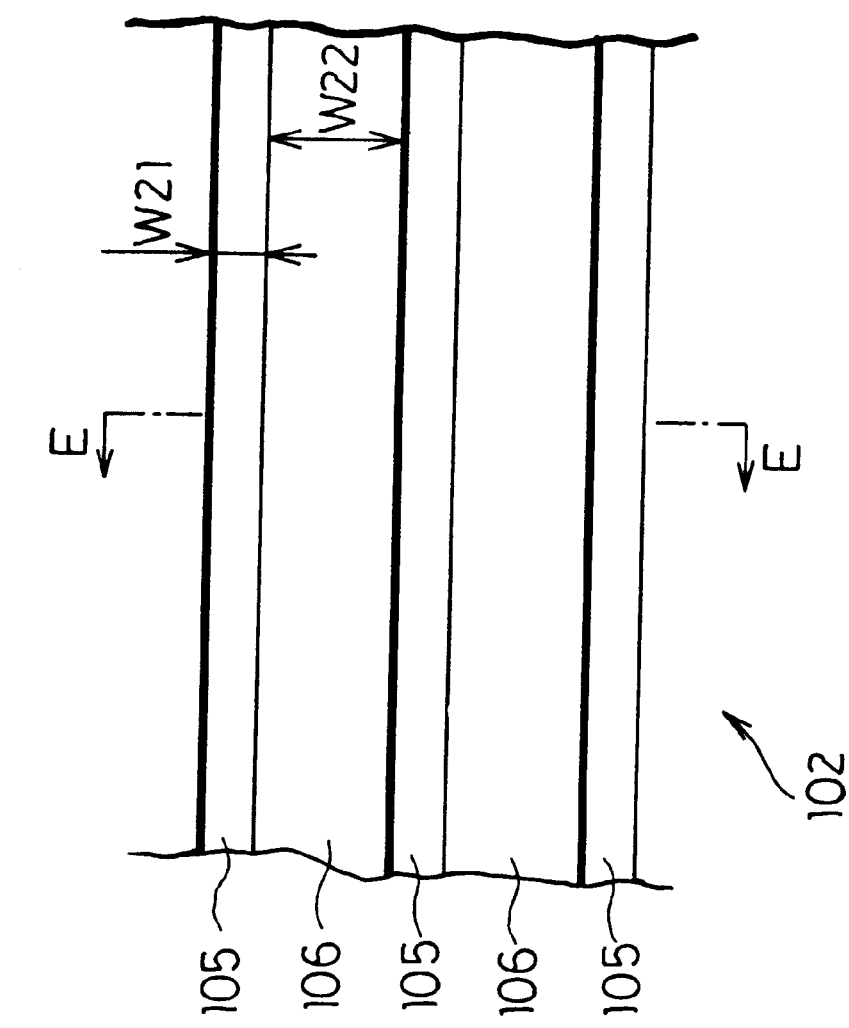

Another example embodiment of the optical disk recording/reproducing apparatus will be explained with reference to FIG. 21. An optical disk recording/reproducing apparatus of the present embodiment is identical with the counterpart of Embodiment 7 except that the rotation control section for the spindle motor is arranged in a different manner, which will be explained in detail in the following.

Upon input of the control signal S78b indicating the kind of the data area from the system controller (signal selecting means) 78, first rotation synchronizing signal generating means (RF signal selecting circuit 73) judges whether the data area being used is the data reproduce-only area 19 or not. In case of the data reproduce-only area 19, the first rotation synchronizing signal generating means selects the pit signal S67 and generates a first rotation synchronizing signal S73b out of the same.

On the other hand, second rotation synchronizing signal generating means (FM demodulation circuit 75) generates a second rotation synchronizing signal S75b out of the wobble signal S66.

After receiving the first rotation synchronizing signal S73b and second rotation synchronizing signal S75b, synchronizing signal selecting means (synchronizing signal selecting circuit 82) selects the former when it judges the data area being used is the data reproduce-only area 19, and the latter when it judges the data area being used is the data recordable area 20 based on the input control signal S78b from the system controller 78. The synchronizing signal selecting means outputs the selected signal as a rotation synchronizing signal S82 to rotation control means (spindle motor control circuit 80) to enable the same to start the rotation control of the spindle motor 81 based on the reference signal S79.

As has been explained, the first rotation synchronizing signal S73b based on the pit signal S67 is used for the data reproduce-only area 19. Thus, the signal is reproduced in sync with the rotation without any adverse effect of the wobbling frequency error caused when forming the guiding grooves 3 on the optical disk 1, namely, producing the optical disk 1. On the other hand, the signal is recorded/reproduced into/from the data recordable area 20 using the second rotation synchronizing signal S75b generated out of the wobble signal S66. Thus, should a wobbling frequency error occur, the adverse effect is negligible, and the signal can be reproduced in sync with the rotation.

As has been explained, a first optical disk of the present invention is a hybrid optical disk having thereon:

tracks for guiding a light beam, said each track being defined by a pair of a guiding groove and a space between adjacent guiding grooves, either side wall of said each guiding groove being wobbled in accordance with address information to form wobbles, the other side wall of said each guiding groove being extended along said tracks;

a data reproduce-only area in which data are recorded in a pit array composed of a continuous concave pattern of pits; and a data recordable area, and characterized in that:

said guiding grooves are composed of said pits, said guiding grooves are used as said data reproduce-only area, and said spaces between adjacent guiding grooves are used as said data recordable area.

According to the above arrangement, the guiding grooves are composed of a concave pattern of pits wobbled in accordance with the address information at either side wall. Accordingly, the tracking along both the guiding grooves and spaces between adjacent guiding grooves has become possible. Also, the address information can be detected from both the guiding grooves and spaces between the adjacent grooves using the wobble signal. Consequently, a hybrid optical disk having thereon alternating data reproduce-only area and data recordable area can be realized by using the guiding grooves where the pits are formed as the data reproduce-only area and the spaces of adjacent guiding grooves where no pits are formed as the data recordable area. Therefore, unlike the conventional hybrid optical disk in which the data reproduce-only area is composed of the guiding grooves and spaces between adjacent guiding grooves and data are recorded in the guiding grooves alone, the optical disk surface is fully utilized for the data recording, thereby increasing the density of the resulting hybrid optical disk.

In addition, if the rotation synchronizing signal is generated from the address information recorded in the pits or wobbles, the data can be reproduced from the pits of the guiding grooves under the CLV control system. On the other hand, if the rotation synchronizing signal is generated from the address information recorded in the wobbles, the data can be recorded/reproduced into/from the spaces between adjacent guiding grooves under the CLV control system using, for example, magneto-optical or phase-change effect. Thus, the guiding grooves are used as the data reproduce-only area and the spaces between the guiding grooves are used as the data recordable area under the CLV control system, thereby further increasing the density of the resulting hybrid optical disk.

Also, the guiding grooves are composed of a concave pattern of pits wobbled intermittently along the track. In other words, the pits also serve as the guiding grooves. Thus, the grooves, wobbles, and pits can be formed by a simple arrangement compared with the conventional arrangements, wherein pits composed of spaces between adjacent guiding grooves and grooves composed of the guiding grooves are provided or a concave portion (pits) is further provided in the guiding grooves. That is, an simple arrangement enables the guiding grooves to play three roles: (1) indicating a tracking polarity, (2) recording the address information, and (3) recording the data. Thus, the data and address information are recorded into the data reproduce-only area while at the same time the guiding grooves for the tracking are produced during the optical disk manufacturing process. Consequently, the manufacturing process can be simplified and shortened.

In addition, since the optical depths of the pits and the optical depths of the grooves are equal and the pit width matches with the grooves width, the shape can be readily managed during the optical disk manufacturing process.

In addition to the first arrangement above, a second optical disk is further characterized in that said data recorded in said pits include a rotation synchronizing signal which is used when a light beam tracks along said guiding grooves.

According to the above arrangement, the guiding grooves used as the data reproduce-only area do not use the wobbles, but the pits as the rotation synchronizing signal. Therefore, the rotation synchronization is achieved without being adversely affected from a wobbling frequency error of the side wall of the guiding grooves, and high-quality data can be reproduced.

In addition to the first arrangement above, a third optical disk is further characterized in that said address information and a rotation synchronizing signal which is used when a light beam tracks along said guiding grooves are recorded into said wobbles.

According to the above arrangement, the pit signal only has to record the reproduction data alone. Consequently, the data utilization is enhanced and a recording capacity is increased.

A fourth optical disk is a hybrid optical disk having thereon:

tracks for guiding a light beam, said each track being defined by a pair of a guiding groove and a space between adjacent guiding grooves, either side wall of said each guiding groove being wobbled in accordance with address information to form wobbles, the other side wall of said each guiding groove being extended along said tracks;

a data reproduce-only area in which data are recorded in a pit array composed of a continuous concave pattern of pits; and a data recordable area, and characterized in that:

said guiding grooves are composed of said pits and continuous grooves, a pit array portion of said guiding grooves is used as said data reproduce-only area, and said spaces between adjacent guiding grooves and said continuous grooves of said guiding grooves are used as said data recordable area.

According to the above arrangement, when the data reproduce-only area does not demand the entire guiding grooves, the pit array is formed on the guiding grooves where necessary to be used as the data reproduce-only area, and instead of the pit array, continuous grooves are formed on the rest of the guiding grooves, so that both the spaces between adjacent guiding grooves and the guiding grooves are used as the data recordable area. Consequently, the guiding grooves are fully utilized, that is, the guiding grooves have no utilized area, namely, an area where the data to be reproduced are not included, thereby forming the largest data record/reproduce area on the optical disk.

In addition to the fourth arrangement above, a fifth optical disk is arranged in such a manner that a wobble amplitude of said pit array is larger than a wobble amplitude of said continuous grooves.

According to the above arrangement, in the guiding grooves composed of the pit array, it has become possible to eliminate the problem that the amplitude of the wobble signal is reduced after the wobble signal has passed through the low-pass filter because no wobble signal is detected between the pits. Consequently, a significant level change of the wobble signal between the data reproduce-only area and data recordable area can be prevented, thereby reducing the address detection errors.

In addition to the fifth arrangement above, a sixth optical disk is arranged in such a manner that the wobble amplitude of said pit array is twice the wobble amplitude of said continuous grooves.

According to the above arrangement, the amplitude of the wobble signal obtained from the pits recorded in a modulation method such that makes an average length of the pits and an average length of spaces between the pits equal matches with the amplitude of the wobble signal obtained from the guiding grooves composed of the continuous grooves. Consequently, a level change of the wobble signal between the data reproduce-only area and data recordable area can be prevented, thereby reducing the address detection errors.

A seventh optical disk is a hybrid optical disk having thereon:

tracks for guiding a light beam, said each track being defined by a pair of a guiding groove and a space between adjacent guiding grooves, either side wall of said each guiding groove being wobbled in accordance with address information to form wobbles, the other side wall of said each guiding groove being extended along said tracks;

a data reproduce-only area in which data are recorded in a pit array composed of a continuous concave pattern of pits; and a data recordable area, and characterized in that:

said guiding grooves are composed of said pits, and control information for controlling recording/reproduction of said data is recorded in at least one of an inner-most track area and an outer-most track area of said optical disk using at least one of said wobbles and pits of said guiding grooves.

According to the above arrangement, the lead-in area where the address management information of the data reproduce-only area and control information including the recording/reproducing conditions of the data recordable area are recorded, and the lead-out area where control information, such as data indicating the end of the track, is recorded can be formatted in the same manner as the data areas. This arrangement can simplify the optical disk manufacturing process. Further, since the control information is recorded in the same manner as the address information, no additional detection circuit is necessary, thereby simplifying the circuitry in the optical disk recording/reproducing apparatus.

An eighth optical disk is a hybrid optical disk having thereon:

tracks for guiding a light beam, said each track being defined by a pair of a guiding groove and a space between adjacent guiding grooves, either side wall of said each guiding groove being wobbled in accordance with address information to form wobbles, the other side wall of said each guiding groove being extended along said tracks;

a data reproduce-only area in which data are recorded in a pit array composed of a continuous concave pattern of pits; and a data recordable area, and characterized in that:

said guiding grooves are composed of said pits and continuous grooves, and control information for controlling recording/reproduction of said data is recorded in at least one of an inner-most track area and an outer-most track area of said optical disk using said wobbles of said continuous grooves of said guiding grooves.

According to the above arrangement, the lead-in area where the address management information of the data reproduce-only area and control information including the recording/reproducing conditions of the data recordable area are recorded, and the lead-out area where control information, such as data indicating the end of the track, is recorded can be formatted in the same manner as the data areas. This arrangement can simplify the optical disk manufacturing process. Further, since the control information is recorded in the same manner as the address information, no additional detection circuit is necessary, thereby simplifying the circuitry in the optical disk recording/reproducing apparatus. Moreover, since the lead-in area or lead-out area is composed of the continuous grooves used as the data recordable area, the data in the control information that need the updating (address management information of the data recordable area, etc.) can be recorded into the continuous grooves using the magneto-optical signal or phase change signal, thereby using the tracks of the optical disk efficiently.

In addition to any of the first through eighth arrangement, a ninth optical disk is characterized in that an edge of said each pit is of a shape of two overlapping arcs each having a diameter of substantially half an average width of said pits.

The above arrangement can suppress the quality degradation of the reproduction signal. More specifically, in the optical disk manufacturing method disclosed in the above-referred Japanese Laid-open Patent Application No. 338066 (1994) (Tokukaihei No. 6-338066), pits having semicircular edge portions with a diameter as long as the pit width are formed using a recording light beam having a spot of substantially the same size as the guiding groove. Therefore, a distance between the pits within a track is different at the center and the edges in the pit width direction. Thus, if the reproduction light beam is shifted from the center of the guiding grooves, the boundary between the pit and a space between the pits varies considerably, thereby reducing the quality of the reproduction signal (increasing jitter). In contrast, according to the arrangement of the present invention, the edge of each pit has a shape of two overlapping arcs each having a diameter of substantially half an average pit width. Compared with the edge having a single arc shape, the edge of the pit of the present invention approximates to a rectangle, in other words, is flattened. Thus, even if the reproduction light beam is shifted from the center of the guiding grooves, the position of the boundary between the pit and a space between the pits hardly varies. Consequently, a quality of the reproduction signal can be upgraded.

Note that the pits on the ninth optical disk can be formed using two light beams: one moving forward along the track and the other moving forward along the wobbles.

In addition to any of the first through ninth arrangements, a tenth optical disk is further characterized in that an optical depth of said each pit is in a range between $\lambda/8$ and $\lambda/5$, where $\lambda$ is a wavelength of said light beam.

According to the above arrangement, both the pit depth and groove depth are set to a range between $1/8$ and $1/5$ of a wavelength of the light beam $\lambda$, the optical depth of the pits forming the guiding grooves is set to a range between $\lambda/8$ and $\lambda/5$. Thus, both the wobble signal (push-pull signal) and pit signal can be detected at half their respective maximum amplitude or higher. Consequently, both the wobble signal and pit signal can be reproduced in a satisfactory manner, and the tracking servo and data reproduction are carried out in a more stable manner.

In addition to any of the first through tenth arrangements above, an eleventh optical disk is further characterized in that said data are recorded in said data recordable area based on a magnetization direction.

According to the above arrangement, a magneto-optical signal is recorded in the data recordable area. The magneto-optical signal and pit signal are different signals having their respective reproduction methods. More specifically, the magneto-optical signal does not change reflectance, and the pit signal does not have the magneto-optical effect. Thus, these two kinds of alternating signals do not interfere with each other. Consequently, crosstalk can be suppressed because either kind of signal from the adjacent tracks do not interfere with the reproduction signal, thereby realizing a narrow track pitch and hence further increasing the density.

In addition to the eleventh arrangement above, a twelfth optical disk is further characterized in that said each space between adjacent guiding grooves is wider than said each guiding groove.

According to the above arrangement, a narrower track pitch can be realized as described below. That is, according to the eleventh arrangement, the crosstalk caused by the adjacent track can be suppressed because the magneto-optical signal and pit signal do not interfere with each other, and a narrow track pitch can be realized. Therefore, the guiding groove width and a width of spaces between adjacent guiding grooves only have to be set to a value such that makes the level of each kind of signal sufficiently large in the magneto-optical signal and pit signal. However, the magneto-optical signal has a small modulation degree. To solve the problem, in the twelfth arrangement, sufficiently large spaces are secured between adjacent guiding grooves, so that a wide recording mark of the magneto-optical signal is recorded therein. Consequently, a sufficient signal level is attained. For example, a CNR of about 45 dB is obtained from a magneto optical signal having a mark length of 0.55 $\mu$m and recorded in a space between the guiding grooves having an average width of 0.7 $\mu$m. However, to attain about the same signal level (mark length: 0.55 $\mu$m, CNR: 45 dB) from the pit signal, a pit width can be as narrow as 0.3 $\mu$m. Therefore, when the guiding grooves and spaces between adjacent guiding grooves have the same widths, since a space width between adjacent guiding grooves necessary for the magneto-optical signal is 0.7 $\mu$m, a track pitch is set to 1.4 $\mu$m. Whereas when the spaces between adjacent guiding grooves are wider than the guiding grooves, the widths of the guiding grooves (pits) and spaces between adjacent guiding grooves are set to 0.3 $\mu$m and 0.7 $\mu$m, respectively. Thus, the track pitch can be reduced to as small as 1.0 $\mu$m. Hence, the track pitch can be further narrowed and the data can be recorded at higher density.

In addition to any of the first through twelfth arrangements above, a thirteenth optical disk is further characterized in that said data reproduce-only area and data recordable area have different linear recording density.

According to the above arrangement, different linear recording density is given to each of the data reproduce-only area and data recordable area, so that linear density for each area can be set to an optimal level in response to the signal form recorded in each data area. Changing the linear recording density in the alternating data reproduce-only area and data recordable area in the above manner makes it possible to set a frequency of a leaking signal from the adjacent track out of a bandwidth of the reproduction signal at the time of reproduction. Consequently, crosstalk of the reproduction signal caused by the adjacent track can be suppressed, thereby allowing a narrower track pitch. Since the data can be recorded at the highest density possible in both the data reproduce-only area and data recordable area, a recording capacity can be further increased.

A first optical disk manufacturing apparatus is an optical disk manufacturing apparatus which records data into an optical disk by forming pits through irradiation of a light beam from irradiating means to a track formed on an optical disk substrate after adjusting a light amount of the light beam for respective data to be recorded by light amount adjusting means, and characterized in that:
said irradiating means irradiates N (N is an integer, and $2 \leq N$) light beams; and
said light amount adjusting means adjusts a light amount of all the light beams,
and further characterized by additionally being furnished with:
light converging means for converging said each light beam onto an optical disk to form a converged light spot having a spot size of substantially 1/M (M is an integer, and $2 \leq M \leq N$) of a pit width of the optical disk; and
wobbling means for wobbling L (L is an integer, and 0<L<N) out of said N light beams along said track in accordance with addresses of said respective data.

According to the above arrangement, an optical disk can be manufactured by a simple manufacturing process that a single light beam is wobbled while an irradiation amount of all the light beams is being adjusted.

Also, the guiding grooves are formed while data are recorded into the pits of the data reproduce-only area, the optical disk manufacturing process can be simplified and shortened.

Since more than one light spot having a diameter of substantially 1/M of the guiding groove width, for example, a half of the guiding groove width, the resulting pits approximate to a rectangle. Consequently, the signal quality can be improved.

In addition to the first arrangement above, a second optical disk manufacturing apparatus is further characterized in that said irradiating means includes at least a first light source and a second light source, from which first and second light beams are emitted, respectively.

According to the above arrangement, a plurality of light beams are emitted from their respective light sources. Therefore, the light beams do not interfere with each other in an optical path within the optical disk manufacturing apparatus, and a darker portion in a plurality of light spots caused by the interference and formed on the photomask or the like can be eliminated. Consequently, a uniformly-exposed, satisfactory optical disk can be manufactured.

Likewise, when more than two light beams are synthesized, an interference problem does not occur. Irradiating more than two light beams can further approximate the pits to a rectangle. Accordingly, the signal quality can be further improved.

In addition, since a light beam is not split, each light source needs only a small light output, which can extend the lifetime of each light source.

A first optical disk recording/reproducing apparatus is an optical disk recording/reproducing apparatus which drives any of the first through eleventh optical disk above by means of a motor and demodulates a reproduction signal obtained from the optical disk based on a reproduction reference frequency by means of data reproducing means, and is characterized by being furnished with:
recording means for recording data into said data recordable area at linear recording density different from liner recording density of said data reproduce-only area;
rotation control means for controlling a revolution of said motor based on a rotation reference signal;
reference signal generating means for generating the rotation reference signals having different frequencies for said data reproduce-only area and data recordable area, respectively, in accordance with said linear recording density used by said recording means;

signal selecting means for selecting one of said data areas; and reference signal switching means for switching said rotation reference signals generated by said reference signal generating means in accordance with the data area selected by said signal selecting means, so that said reproducing reference frequency remains at a constant level.

According to the above arrangement, the recording means records the data into the data recordable area at linear recording density different from the linear recording density of the data reproduce-only area. When a signal is reproduced from the optical disk in which the data are recorded at different linear recording density in the data reproduce-only area and data recordable area, the reference signal switching means switches a frequency of the rotation reference signal inputted into the rotation control means. Consequently, the motor is rotated under a control at different linear velocity, so that the reproduction reference frequency for demodulating an output signal reproduced from each data area stays at a constant level. Therefore, a reproduction circuit serving as data reproduction means for receiving and decoding an output signal reproduced from each data area and selected by the signal selecting means can be shared with the both data areas. Consequently, the reproduction circuitry can be simplified.

A second optical recording/reproducing apparatus is an optical disk recording/reproducing apparatus for recording/reproducing data into any of the first, second, fourth, and eleventh optical disk above through a CLV control system based on a rotation synchronizing signal, characterized by being furnished with:

signal selecting means for selecting one of said data areas;

first rotation synchronizing signal generating means for generating a first rotation synchronizing signal out of a pit signal recorded into said pits;

second rotation synchronizing signal generating means for generating a second rotation synchronizing signal out of a wobble signal recorded into said wobbles; and synchronizing signal selecting means for, when said signal selecting means has selected said data reproduce-only area, activating said first rotation synchronizing signal generating means to generate said first rotation synchronizing signal, and when said signal selecting means has selected said data recordable area, said synchronizing signal selecting means for activating said second rotation synchronizing signal generating means to generate said second rotation synchronizing signal.

According to the above arrangement, when a signal is reproduced from the data reproduce-only area, a rotation synchronizing signal is generated out of the pit signal. Consequently, a satisfactory reproduction signal in sync with rotation can be reproduced without any adverse effect of the wobble frequency error caused during the guiding groove manufacturing process. On the other hand, when a signal is recorded/reproduced into/from the data recordable area, a rotation synchronizing signal produced out of the wobble signal is used as a reference both in the signal recording and reproduction, and an error caused while the wobbles were formed can be offset. Therefore, a satisfactory reproduction signal in sync with rotation can be reproduced. In short, a satisfactory rotation synchronization can be reproduced either in the data reproduce-only area or data recordable area. Consequently, it has become possible to reproduce the data from the high-density optical disk under the CLV control system.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A hybrid optical disk having thereon:

tracks for guiding a light beam, said each track being defined by a pair of a guiding groove and a space between adjacent guiding grooves, the guiding groove having a pair of side walls, one of said side walls of said each guiding groove being wobbled in accordance with address information to form wobbles, the other of said side walls of said each guiding groove being extended along said tracks;

a data reproduce-only area in which data are recorded in a pit array composed of a continuous concave pattern of pits; and a data recordable area, wherein, said guiding grooves are composed of said pits, said guiding grooves are used as said data reproduce-only area, and said spaces between adjacent guiding grooves are used as a said data recordable area; and wherein data, address information, and a tracking error signal are detected from each of said guiding grooves and said spaces between adjacent guiding grooves with a single light beam.

2. The optical disk of claim 1, wherein said data recorded in said pits include a rotation synchronizing signal which is used when a light beam tracks along said guiding grooves.

3. The optical disk of claim 1, wherein said address information and a rotation synchronizing signal which is used when a light beam tracks along said guiding grooves are recorded into said wobbles.

4. The optical disk of claim 1, wherein a rotation synchronizing signal which is used when a light beam tracks along said spaces between adjacent guiding grooves is recorded into said wobbles.

5. The optical disk of claim 1, wherein an average width of said guiding grooves and an average width of spaces between adjacent guiding grooves are substantially equal.

6. A hybrid optical disk having thereon:

tracks for guiding a light beam, said each track being defined by a pair of a guiding groove and a space between adjacent guiding grooves, the guiding groove having a pair of side walls, one of said side walls of said each guiding groove being wobbled in accordance with address information to form wobbles, the other of said side walls of said each guiding groove being extended along said tracks;

a data reproduce-only area in which data are recorded in a pit array composed of a continuous concave pattern of pits; and a data recordable area, wherein, said guiding grooves are composed of said pits and continuous grooves, a pit array portion of said guiding grooves is used as said data reproduce-only area, and said space between adjacent guiding grooves and said continuous grooves of said guiding grooves are used as said data recordable area; and wherein
    data, address information, and a tracking error signal are detected from each of said guiding grooves and said spaces between adjacent guiding grooves with a single light beam.

7. The optical disk of claim 6, wherein a wobble amplitude of said pit array is larger than a wobble amplitude of said continuous grooves.

8. The optical disk of claim 7, wherein a wobble amount of said pits is at least twice a wobble amount of said continuous grooves.

9. The optical disk of claim 8, wherein the wobble amplitude of said pit array is twice the wobble amplitude of said continuous grooves.

10. The optical disk of claim 6, wherein said address information and a rotation synchronizing signal which is used when a light beam tracks along said guiding grooves are recorded in said wobbles.

11. The optical disk of claim 6, wherein data, which update said data recorded in said guiding grooves in a track area where said guiding grooves are composed of said pits, are recorded in said guiding grooves in another track area where said guiding grooves are composed of said continuous grooves.

12. A hybrid optical disk having thereon:
    tracks for guiding a light beam, said each track being defined by pair of a guiding groove and a space between adjacent guiding grooves, the guiding groove having a pair of side walls, one of said side walls of said each guiding groove being wobbled in accordance with address information to form wobbles, the other of said side walls of said each guiding groove being extended along said track;
    a data reproduce-only area in which data are recorded in a pit array composed of a continuous concave pattern of pits; and
    a data recordable area,
wherein
    said guiding grooves are composed of said pits, and control information for controlling recording/reproduction of said data is recorded in at least one of an inner-most track area and an outer-most track area of said optical disk using at least one of said wobbles and pits of said guiding grooves; and
wherein
    data, address information, and a tracking error signal are detected from each of said guiding grooves and said spaces between adjacent guiding grooves with a single light beam.

13. A hybrid optical disk having thereon:
    tracks for guiding a light beam, said each track being defined by a pair of a guiding groove and a space between adjacent guiding grooves, the guiding groove having a pair of side walls, one of said side walls of said each guiding groove being wobbled in accordance with address information to form wobbles, the other of said side walls of said each guiding groove being extended along said tracks;
    a data reproduce-only area in which data are recorded in a pit array composed of a continuous concave pattern of pits; and
    a data recordable area,
wherein
    said guiding grooves are composed of said pits and continuous grooves, and control information for controlling recording/reproduction of said data is recorded in at least one of an inner-most track area and an outer-most track area of said optical disk using said wobbles of said continuous grooves of said guiding grooves; and
wherein
    data, address information, and a tracking error signal are detected from each of said guiding grooves and said spaces between adjacent guiding grooves with a single light beam.

14. The optical disk of claim 1, 6, 12, or 13, wherein an edge of said each pit is of a shape of two overlapping arcs each having a diameter of substantially half an average width of said pits.

15. The optical disk of claim 1, 6, 12, or 13, wherein an optical depth of said each pit is in a range between $\lambda/8$ and $\lambda/5$, where $\lambda$ is a wavelength of said light beam.

16. The optical disk of claim 1, 6, 12, or 13, wherein said data are recorded in said data recordable area based on a magnetization direction.

17. The optical disk of claim 16, wherein said each space between adjacent guiding grooves is wider than said each guiding groove.

18. The optical disk of claim 1, 6, 12, or 13, wherein said data are recorded in said data recordable area by utilizing a difference in reflectance between a crystal phase and an amorphous phase.

19. The optical disk of claim 18, wherein said each space between adjacent guiding grooves is wider than said each guiding groove.

20. The optical disk of claim 1, 6, 12, or 13, wherein said data reproduce-only area and data recordable area have different linear recording density.

21. An optical disk manufacturing apparatus comprising:
    irradiating means for irradiating N (N is an integer, and $2 \leq N$) light beams on a track formed on an optical disk substrate to form a pit to record data therein;
    light amount adjusting means for adjusting a light amount of all the light beams for respective data to be recorded;
    light converging means for converging said each light beam onto an optical disk to form a converged light spot having a spot size of substantially 1/M (M is an integer, and $2 \leq M \leq N$) of a pit width of said optical disk; and
    wobbling means for wobbling L (L is an integer, and 0<L<N) out of said N light beams along said track in accordance with addresses of said respective data.

22. The optical disk manufacturing apparatus of claim 21, wherein:
    said irradiating means irradiates at least first and second light beams;
    said light converging means converges said each light beam on said optical disk to form the converged light spot having a diameter of substantially half a pit width of said optical disk; and
    said wobbling means wobbles said second light beam along said track in accordance with said address.

23. The optical disk manufacturing apparatus of claim 21, wherein said irradiating means includes:
    a light source; and
    light splitting means for splitting a light beam emitted from said light source into at least first and second light beams.

24. The optical disk manufacturing apparatus of claim 21, wherein said irradiating means includes at least a first light source and a second light source, from which first and second light beams are emitted, respectively.

25. An optical disk recording/recording apparatus of an optical disk having thereon:
   tracks for guiding a light beam, said each track being defined by a pair of a guiding groove and a space between adjacent guiding grooves, either side wall of said each guiding groove being wobbled in accordance with address information to form wobbles, the other side wall of said each guiding groove being extended along said tracks;
   a data reproduce-only area in which data are recorded in a pit array composed of a continuous concave pattern of pits; and
   a data recordable area,
said apparatus comprising:
   a motor for driving said optical disk;
   data reproducing means for demodulating a reproduction signal obtained from said optical disk based on a reproducing reference frequency;
   recording means for recording data into said data recordable area at linear recording density different from liner recording density of said data reproduce-only area;
   rotation control means for controlling a revolution of said motor based on a rotation reference signal;
   reference signal generating means for generating the rotation reference signals having different frequencies for said data reproduce-only area and data recordable area, respectively, in accordance with said linear recording density used by said recording means;
   signal selecting means for selecting one of said data areas; and
   reference signal switching means for switching said rotation reference signals generated by said reference signal generating means in accordance with the data area selected by said signal selecting means, so that said reproducing reference frequency remains at a constant level.

26. The optical disk recording/reproducing apparatus of claim 25, wherein the rotation reference signal generated by said reference signal generating means for said data reproduce-only area has half a frequency of the rotation reference signal for said data recordable area.

27. The optical disk recording/reproducing apparatus of claim 25, wherein said recording means records said data into said data recordable area based on a magnetization direction.

28. The optical disk recording/reproducing apparatus of claim 25, wherein said recording means records said data into said data recordable area by utilizing a difference in reflectance between a crystal phase and an amorphous phase.

29. A recording/reproducing apparatus of an optical disk having thereon:
   tracks for guiding a light beam, said each track being defined by a pair of a guiding groove and a space between adjacent guiding grooves, either side wall of said each guiding groove being wobbled in accordance with address information to form wobbles, the other side wall of said each guiding groove being extended along said tracks;
   a data reproduce-only area in which data are recorded in a pit array composed of a continuous concave pattern of pits; and
   a data recordable area,
said apparatus comprising:
   recording/reproducing means for recording/reproducing data into/from said optical disk through a CLV control system based on a rotation synchronizing signal;
   signal selecting means for selecting one of said data areas;
   first rotation synchronizing signal generating means for generating a first rotation synchronizing signal out of a pit signal recorded into said pits;
   second rotation synchronizing signal generating means for generating a second rotation synchronizing signal out of a wobble signal recorded into said wobbles; and
   synchronizing signal selecting means for, when said signal selecting means has selected said data reproduce-only area, activating said first rotation synchronizing signal generating means to generate said first rotation synchronizing signal, and when said signal selecting means has selected said data recordable area, said synchronizing signal selecting means for activating said second rotation synchronizing signal generating means to generate said second rotation synchronizing signal.

30. A recording/reproducing apparatus of an optical disk having thereon:
   tracks for guiding a light beam, said each track being defined by a pair of a guiding groove and a space between adjacent guiding grooves, either side wall of said each guiding groove being wobbled in accordance with address information to form wobbles, the other side wall of said each guiding groove being extended along said tracks; and
   a data reproduce-only area in which data are recorded in a pit array composed of a continuous concave pattern of pits;
   a data recordable area,
   said guiding grooves being composed of said pits and continuous grooves,
   a pit array portion of said guiding grooves being used as said data reproduce-only area, and
   said spaces between adjacent guiding grooves and said continuous grooves of said guiding grooves being used as said data recordable area,
said apparatus comprising:
   a motor for driving said optical disk;
   data reproducing means for demodulating a reproduction signal obtained from said optical disk based on a reproducing reference frequency; and
   recording means for recording data, which update said data recorded in said guiding grooves in a track area where said guiding grooves are composed of said pits, in said guiding grooves in another track area where said guiding grooves are composed of said continuous grooves.

31. A hybrid optical disk having thereon first tracks repetitively forced for recording reproduce-only data in a pit array composed of a continuous concave pattern of pits, wherein:
   said each pit has a first side wall that falls on a first line along said first tracks and a second side wall that opposes said first side wall and falls on a second line forming wobbles wobbling in accordance with address information; and
   a recording film is provided at least to a space between every adjacent first track, so that said each space is used as a data recordable second track.

32. The optical disk of claim 31, wherein said data recorded in said pits include a rotation synchronizing signal which is used when a light beam tracks along said first tracks.

33. The optical disk of claim 31, wherein a rotation synchronizing signal which is used when a light beam tracks along said first tracks is further recorded into said wobbles.

34. The optical disk of claim 31, wherein a rotation synchronizing signal which is used when a light beam tracks along said second tracks is recorded into said wobbles.

35. The optical disk of claim 31, where an average width of said first tracks and an average width of said second tracks are substantially equal.

36. A hybrid optical disk having thereon a plurality of track areas provided adjacently along a radius of said optical disk, said plurality of track areas having different data recording formats, wherein, in a first track area, being at least one of said plurality of track areas:

first tracks are repetitively formed for recording reproduce-only data in a pit array composed of a continuous concave pattern of pits;

said each pit has a first side wall that falls on a first line along said first tracks and a second side wall that opposes said first side wall and falls on a second line forming wobbles wobbling in accordance with address information; and a recording film is provided at least to a space between said every adjacent first track, so that said each space is used as a data recordable second track.

37. The optical disk of claim 36, wherein, in a second track area, which is one of said plurality of track areas different from said first track area, grooves are formed repetitively along the radius, said each groove having a pair of side walls, one of said side walls of said each groove being wobbled in accordance with address information to form wobbles, said grooves and a space between adjacent groove being used as a data recordable area.

38. The optical disk of claim 37, wherein a wobble amplitude of said pit array is larger than a wobble amplitude of said grooves.

39. The optical disk of claim 38, where in a wobble amount of said pits is at least twice a wobble amount of said grooves.

40. The optical disk of claim 37, wherein the wobble amplitude of said pit array is twice the wobble amplitude of said grooves.

41. The optical disk of claim 36, wherein said address information and a rotation synchronizing signal which is used when a light beam tracks along said first tracks are recorded in said wobbles.

42. The optical disk of claim 37, wherein data, which update said data recorded in said first track area, are recorded in said grooves in said second track area.

43. The optical disk of claim 31, wherein control information for controlling recording/reproduction of said data is recorded in at least one of an inner-most track area and an outer-most track area of said optical disk using at least one of said wobbles and pits.

44. The optical disk of claim 37, wherein control information for controlling recording/reproduction of said data is recorded in at least one of an inner-most track area and an outer-most track area of said optical disk using said wobbles of said grooves.

45. The optical disk of claim 31, wherein an edge of said each pit is of a shape of two overlapping arcs each having a diameter of substantially half an average width of said pits.

46. The optical disk of claim 36, wherein an edge of said each pit is of a shape of two overlapping arcs each having a diameter of substantially half an average width of said pits.

47. The optical disk of claim 31, wherein an optical depth of said each pit is in a range between $\lambda/8$ and $\lambda/5$, where $\lambda$ is a wavelength of a light beam which scans said optical disk.

48. The optical disk of claim 36, wherein an optical depth of said each pit is in a range between $\lambda/8$ and $\lambda/5$, where $\lambda$ is a wavelength of a light beam which scans said optical disk.

49. The optical disk of claim 31, wherein said data are recorded in said second tracks based on a magnetization direction.

50. The optical disk of claim 37, wherein said data are recorded in said second tracks and second track area based on a magnetization direction.

51. The optical disk of claim 49, wherein said second tracks are wider than said first tracks.

52. The optical disk of claim 50, wherein:

said second tracks are wider than said first tracks; and said spaces are wider than said grooves.

53. The optical disk of claim 31, wherein said data are recorded in said second tracks by utilizing a difference in reflectance between a crystal phase and a amorphous phase.

54. The optical disk of claim 37, wherein said data are recorded in said second tracks and second track area by utilizing a difference in reflectance between a crystal phase and an amorphous phase.

55. The optical disk of claim 53, wherein said second tracks are wider than said first tracks.

56. The optical disk of claim 54, wherein:

said second tracks are wider than said first tracks; and said spaces are wider than said grooves.

57. The optical disk of claim 31, wherein said first tracks and second tracks have different linear recording density.

58. The optical disk of claim 37, wherein said first tracks, second tracks and second track area have different linear recording density.

* * * * *

UNITED STATES PATENT AND TRADEMARK OFFICE

CERTIFICATE OF CORRECTION

PATENT NO.: 5,940,364

DATED: August 17, 1999

INVENTOR(S): Nobuo Ogata, Yasuo Nakata and Yoshihiro Sekimoto

It is certified that error appears in the above-identified patent and that said Letters Patent is hereby corrected as shown below:

On the Cover page, column 1, between line [22] and line [51], please insert

--[30] Foreign Application Priority Data
Apr. 19, 1996   [JP]   Japan............................8-98770
Mar. 30, 1997   [JP]   Japan............................9-59681--

Signed and Sealed this

Thirtieth Day of May, 2000

Attest:

Q. TODD DICKINSON

*Attesting Officer*          *Director of Patents and Trademarks*

UNITED STATES PATENT AND TRADEMARK OFFICE
CERTIFICATE OF CORRECTION

PATENT NO. : 5,940,364
DATED : August 17, 1999
INVENTOR(S) : Nobuo Ogata, Yasuo Nakata and Yoshihiro Sekimoto It is certified that error appears in the above-identified patent and that said Letters Patent is hereby corrected as shown below:

Title page,
Item [30], Foreign Application Priority Data, after
"Apr. 19, 1996  [JP]     Japan………………..8-98770" insert
-- Mar. 13, 1997  [JP]     Japan………………..9-59681 --

Signed and Sealed this

Twelfth Day of April, 2005

JON W. DUDAS
*Director of the United States Patent and Trademark Office*